United States Patent
Avakian et al.

(10) Patent No.: US 11,763,252 B2
(45) Date of Patent: *Sep. 19, 2023

(54) INTELLIGENT MARKETING AND ADVERTISING PLATFORM

(71) Applicant: Cooler Screens Inc., Chicago, IL (US)

(72) Inventors: Arsen Avakian, Chicago, IL (US); Robert Edwin Dravenstott, Chicago, IL (US)

(73) Assignee: Cooler Screens Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/763,448

(22) PCT Filed: Dec. 17, 2019

(86) PCT No.: PCT/US2019/066869
§ 371 (c)(1),
(2) Date: May 12, 2020

(87) PCT Pub. No.: WO2020/131881
PCT Pub. Date: Jun. 25, 2020

(65) Prior Publication Data
US 2021/0366005 A1    Nov. 25, 2021

Related U.S. Application Data

(63) Continuation-in-part of application No. 16/222,643, filed on Dec. 17, 2018, now Pat. No. 10,769,666, (Continued)

(51) Int. Cl.
*G06Q 30/00* (2012.01)
*G06Q 10/087* (2023.01)
(Continued)

(52) U.S. Cl.
CPC ....... *G06Q 10/087* (2013.01); *G06Q 30/0201* (2013.01); *G06Q 30/0281* (2013.01); (Continued)

(58) Field of Classification Search
None
See application file for complete search history.

(56) References Cited

U.S. PATENT DOCUMENTS 2,002,322 A   5/1935   Kraemer
4,371,870 A   2/1983   Biferno
(Continued)

FOREIGN PATENT DOCUMENTS

CN   102113033 B   3/2014
CN   105513052 A   4/2016
(Continued)

OTHER PUBLICATIONS

Kamoda, Rena. "Monitoring Grocery Inventory in Refrigerators using Appearance and Load Balance Features." (2013). (Year: 2013).*

(Continued)

*Primary Examiner* — Michael Bekerman
(74) *Attorney, Agent, or Firm* — Banner & Witcoff, Ltd.

(57) ABSTRACT

An intelligent marketing and advertising platform which provides an innovative merchandising solution for retailers by effectively transforming the glass surface of retail product containers (such as cooler doors) into a non-transparent display of planograms. The merchandising solution provides for digital planograms and pricing management, real time promotional updates and sales data, etc. This is accomplished by converting/transforming the simple glass surface of a retail product container (such as cooler/freezer doors) into digital "smart" screens that provide for innovative advertising solutions. The cooler/freezer doors are config-
(Continued)

System Architecture: Display array with sensors and cameras driven by Remote/Networked video controllers and encased in protective enclosure ured to use at least one camera to capture images when the doors are opened, in order to effectively take inventory of what is inside the cooler/freezer.

20 Claims, 15 Drawing Sheets

Related U.S. Application Data which is a continuation-in-part of application No. PCT/US2018/046103, filed on Aug. 9, 2018, and a continuation-in-part of application No. 15/674,198, filed on Aug. 10, 2017, now Pat. No. 10,672,032.

(51) Int. Cl.
| | |
|---|---|
| *G06Q 30/02* | (2023.01) |
| *G09F 9/30* | (2006.01) |
| *H04N 7/18* | (2006.01) |
| *G06Q 30/0201* | (2023.01) |
| *G06V 20/52* | (2022.01) |
| *G06V 40/16* | (2022.01) |

(52) U.S. Cl.
CPC ............ *G06V 20/52* (2022.01); *G06V 40/161* (2022.01); *G09F 9/30* (2013.01); *H04N 7/183* (2013.01); *G06V 40/178* (2022.01)

(56) References Cited

U.S. PATENT DOCUMENTS

| | | |
|---|---|---|
| 4,671,582 A | 6/1987 | Stromquist et al. |
| 4,893,902 A | 1/1990 | Baughman et al. |
| 4,998,382 A | 3/1991 | Kostos et al. |
| 5,024,023 A | 6/1991 | Kostos et al. |
| 5,111,618 A | 5/1992 | Kaspar et al. |
| 5,116,274 A | 5/1992 | Artwohl et al. |
| 5,255,473 A | 10/1993 | Kaspar et al. |
| 5,270,843 A | 12/1993 | Wang |
| 5,645,330 A | 7/1997 | Artwohl et al. |
| 6,005,652 A | 12/1999 | Matsuhira |
| 6,148,563 A | 11/2000 | Roche et al. |
| 6,377,228 B1 | 4/2002 | Jenkin et al. |
| 6,427,772 B1 | 8/2002 | Oden et al. |
| 6,475,087 B1 | 11/2002 | Cole |
| 6,476,885 B1 | 11/2002 | Murray et al. |
| 6,606,832 B2 | 8/2003 | Richardson et al. |
| 6,606,833 B2 | 8/2003 | Richardson et al. |
| 6,874,903 B2 | 4/2005 | Yang et al. |
| 7,072,096 B2 | 7/2006 | Holman et al. |
| 7,121,675 B2 | 10/2006 | Ter-Hovhannisian |
| 7,259,359 B2 | 8/2007 | Davey et al. |
| 7,290,707 B2 | 11/2007 | Sawasaki |
| 7,319,407 B2 | 1/2008 | Jang et al. |
| 7,377,125 B2 | 5/2008 | Seiden et al. |
| 7,413,233 B1 | 8/2008 | Jung |
| 7,513,637 B2 | 4/2009 | Kelly et al. |
| 7,593,867 B2 | 9/2009 | Deakin et al. |
| 7,824,056 B2 | 11/2010 | Madireddi et al. |
| 7,870,686 B2 | 1/2011 | Hines |
| 7,934,384 B2 | 5/2011 | Fuskiewicz et al. |
| 7,978,184 B2 | 7/2011 | Morrison |
| 3,009,864 A1 | 8/2011 | Linaker et al. |
| 8,189,855 B2 | 5/2012 | Opalach et al. |
| 8,219,438 B1 | 7/2012 | Moon et al. |
| 8,335,254 B1 | 12/2012 | Fernandez et al. |
| 8,468,059 B2 | 6/2013 | Enqvist |
| 8,630,924 B2 | 1/2014 | Groenevelt et al. |
| 8,672,427 B2 | 3/2014 | Hammonds |
| 8,683,745 B2 | 4/2014 | Artwohl et al. |
| 8,955,261 B2 | 2/2015 | Kobe et al. |
| 8,972,291 B2 | 3/2015 | Rimnac et al. |
| 9,046,294 B2 | 6/2015 | Lee et al. |
| 9,052,536 B2 | 6/2015 | Artwohl et al. |
| 9,098,825 B2 | 8/2015 | Bashkin |
| 9,144,328 B2 | 9/2015 | Seeley |
| 9,155,405 B2 | 10/2015 | Artwohl et al. |
| 9,230,386 B2 | 1/2016 | Roh et al. |
| 9,280,757 B2 | 3/2016 | Parpia et al. |
| 9,336,508 B2 | 5/2016 | Soon-Shiong |
| 9,349,238 B2 | 5/2016 | Tkachenko et al. |
| 9,361,628 B2 | 6/2016 | Stark |
| 9,504,338 B2 | 11/2016 | Artwohl et al. |
| 9,514,661 B2 | 12/2016 | Riegel |
| 9,524,419 B2 | 12/2016 | Chang |
| 9,560,777 B2 | 1/2017 | Krietzman et al. |
| 9,575,558 B2 | 2/2017 | Almen et al. |
| 9,689,603 B2 | 6/2017 | Roh et al. |
| 9,710,992 B2 | 7/2017 | Borra |
| 9,860,491 B2 | 1/2018 | Park et al. |
| 9,881,528 B2 | 1/2018 | Dunn |
| 9,911,377 B2 | 3/2018 | Howard et al. |
| 9,915,471 B2 | 3/2018 | Kim et al. |
| 9,959,568 B2 | 5/2018 | Klearman |
| 9,967,109 B2 | 5/2018 | Nishimura et al. |
| 9,972,284 B2 | 5/2018 | Lee et al. |
| 10,062,257 B2 | 8/2018 | Chau |
| 10,085,571 B2 | 10/2018 | Schiffman et al. |
| 10,089,520 B2 | 10/2018 | Motukuri et al. |
| 10,089,952 B2 | 10/2018 | Nam et al. |
| 10,122,915 B2 | 11/2018 | Maayan et al. |
| 10,126,849 B2 | 11/2018 | Lee et al. |
| 10,169,677 B1 | 1/2019 | Ren et al. |
| 10,258,170 B2 | 4/2019 | Dunn et al. |
| 10,282,695 B1 | 5/2019 | McNamara et al. |
| 10,304,417 B2 | 5/2019 | Park et al. |
| 10,360,571 B2 | 7/2019 | Garel et al. |
| 10,419,647 B2 | 9/2019 | Park et al. |
| 10,477,162 B2 | 11/2019 | Jain et al. |
| 10,514,722 B1 | 12/2019 | Artwohl et al. |
| 10,575,660 B2 | 3/2020 | Artwohl et al. |
| 10,580,333 B2 | 3/2020 | Artwohl et al. |
| 10,674,569 B2 | 6/2020 | Luckhardt et al. |
| RE48,115 E | 7/2020 | Artwohl et al. |
| 10,838,453 B2 | 11/2020 | Artwohl et al. |
| 10,937,344 B2 | 3/2021 | Artwohl et al. |
| 11,047,614 B2 | 6/2021 | Kim et al. |
| 11,107,023 B2 | 8/2021 | Glasgow et al. |
| 11,141,004 B1 | 10/2021 | Rolek |
| RE49,103 E | 6/2022 | Artwohl et al. |
| 11,419,434 B1 | 8/2022 | Artwohl et al. |
| 11,435,777 B2 | 9/2022 | Artwohl et al. |
| 11,450,247 B2 | 9/2022 | Artwohl et al. |
| 2001/0010516 A1 | 8/2001 | Roh et al. |
| 2001/0052741 A1 | 12/2001 | Yun |
| 2002/0007486 A1 | 1/2002 | Yun |
| 2003/0038912 A1 | 2/2003 | Broer et al. |
| 2003/0117790 A1 | 6/2003 | Lee et al. |
| 2003/0154141 A1 | 8/2003 | Capazario et al. |
| 2003/0205059 A1 | 11/2003 | Roche et al. |
| 2003/0207090 A1 | 11/2003 | Arora |
| 2003/0214619 A1 | 11/2003 | Masuda et al. |
| 2004/0073334 A1 | 4/2004 | Terranova |
| 2004/0093379 A1 | 5/2004 | Roh et al. |
| 2004/0144328 A1 | 7/2004 | Bonner et al. |
| 2004/0160388 A1 | 8/2004 | O'Keeffe |
| 2004/0194388 A1 | 10/2004 | Roche et al. |
| 2005/0068629 A1 | 3/2005 | Fernando et al. |
| 2005/0172654 A1 | 8/2005 | Rohrer et al. |
| 2005/0202178 A1 | 9/2005 | Roche et al. |
| 2005/0265019 A1 | 12/2005 | Sommers et al. |
| 2006/0103269 A1 | 5/2006 | Artwohl et al. |
| 2006/0127586 A1 | 6/2006 | Roche et al. |
| 2006/0145576 A1 | 7/2006 | Lee et al. |
| 2006/0158579 A1 | 7/2006 | Hasegawa |
| 2006/0174641 A1 | 8/2006 | Liu et al. |
| 2006/0192767 A1 | 8/2006 | Murakami |
| 2007/0003700 A1 | 1/2007 | Roche et al. |
| 2007/0016478 A1 | 1/2007 | Hill |
| 2007/0024822 A1 | 2/2007 | Cortenraad et al. |
| 2007/0058114 A1 | 3/2007 | Niiyama et al. |
| 2007/0076431 A1 | 4/2007 | Atarashi et al. |
| 2007/0151274 A1 | 7/2007 | Roche et al. |

(56) References Cited

U.S. PATENT DOCUMENTS

| | | |
|---|---|---|
| 2007/0162182 A1 | 7/2007 | Marti et al. |
| 2007/0171647 A1 | 7/2007 | Artwohl et al. |
| 2007/0193280 A1 | 8/2007 | Fuskiewicz et al. |
| 2007/0195535 A1 | 8/2007 | Artwohl et al. |
| 2007/0216657 A1 | 9/2007 | Konicek |
| 2008/0004950 A1 | 1/2008 | Huang et al. |
| 2008/0024047 A1 | 1/2008 | Juo et al. |
| 2008/0158858 A1 | 7/2008 | Madireddi et al. |
| 2009/0002990 A1 | 1/2009 | Becker et al. |
| 2009/0036208 A1 | 2/2009 | Pennington et al. |
| 2009/0052206 A1 | 2/2009 | Matsui et al. |
| 2009/0121970 A1 | 5/2009 | Ozbek |
| 2009/0146945 A1 | 6/2009 | Cho |
| 2009/0276319 A1 | 11/2009 | Lungu et al. |
| 2009/0295731 A1 | 12/2009 | Kim et al. |
| 2009/0306820 A1 | 12/2009 | Simmons et al. |
| 2009/0313125 A1 | 12/2009 | Roh et al. |
| 2010/0013925 A1 | 1/2010 | Fowler et al. |
| 2010/0026912 A1 | 2/2010 | Ho |
| 2010/0043293 A1 | 2/2010 | Nicholson et al. |
| 2010/0062152 A1 | 3/2010 | Roche et al. |
| 2010/0068398 A1 | 3/2010 | Roche et al. |
| 2010/0083672 A1 | 4/2010 | Yoon et al. |
| 2010/0119705 A1 | 5/2010 | Roche et al. |
| 2010/0152892 A1 | 6/2010 | Gavra et al. |
| 2010/0180615 A1 | 7/2010 | Linder et al. |
| 2010/0214786 A1 | 8/2010 | Nichol |
| 2010/0268792 A1 | 10/2010 | Butler et al. |
| 2010/0275477 A1 | 11/2010 | Kim |
| 2010/0293827 A1 | 11/2010 | Suss et al. |
| 2011/0022980 A1* | 1/2011 | Segal .................... G07F 9/023 |
| | | 715/764 |
| 2011/0083460 A1 | 4/2011 | Thomas et al. |
| 2011/0098849 A1 | 4/2011 | Hudis et al. |
| 2011/0116231 A1 | 5/2011 | Dunn et al. |
| 2011/0141011 A1 | 6/2011 | Lashina et al. |
| 2011/0150276 A1 | 6/2011 | Eckhoff et al. |
| 2011/0161160 A1* | 6/2011 | Carlson ................ G06Q 30/02 |
| | | 705/14.41 |
| 2011/0173082 A1 | 7/2011 | Breitenbach et al. |
| 2011/0181792 A1 | 7/2011 | Hammonds |
| 2011/0191154 A1* | 8/2011 | Johnson ............ G06Q 30/0241 |
| | | 705/14.4 |
| 2012/0004769 A1 | 1/2012 | Hallenbeck et al. |
| 2012/0105424 A1 | 5/2012 | Lee et al. |
| 2012/0217254 A1 | 8/2012 | Cho et al. |
| 2012/0285089 A1 | 11/2012 | Artwohl et al. |
| 2012/0323620 A1 | 12/2012 | Hofman et al. |
| 2013/0063326 A1 | 3/2013 | Riegel |
| 2013/0271696 A1 | 10/2013 | Dunn |
| 2013/0325638 A1 | 12/2013 | Auclair et al. |
| 2014/0078407 A1 | 3/2014 | Green et al. |
| 2014/0126829 A1 | 5/2014 | Seeley et al. |
| 2014/0129354 A1* | 5/2014 | Soon-Shiong ........ G06F 3/0484 |
| | | 705/16 |
| 2014/0129393 A1 | 5/2014 | Soon-Shiong |
| 2014/0214547 A1 | 7/2014 | Signorelli et al. |
| 2014/0232958 A1 | 8/2014 | Venturas et al. |
| 2014/0316561 A1 | 10/2014 | Tkachenko et al. |
| 2014/0344118 A1 | 11/2014 | Parpia et al. |
| 2015/0002660 A1* | 1/2015 | Lee ........................ F25D 29/00 |
| | | 348/135 |
| 2015/0073590 A1 | 3/2015 | Garcia Manchado et al. |
| 2015/0178654 A1 | 6/2015 | Glasgow et al. |
| 2015/0269593 A1 | 9/2015 | Le |
| 2016/0027231 A1 | 1/2016 | Guzzone et al. |
| 2016/0040469 A1 | 2/2016 | Lietz et al. |
| 2016/0047587 A1 | 2/2016 | Sasaki et al. |
| 2016/0138860 A1* | 5/2016 | Kang ...................... F25D 29/00 |
| | | 62/130 |
| 2016/0143459 A1 | 5/2016 | Clein |
| 2016/0220039 A1 | 8/2016 | Chang et al. |
| 2016/0350715 A1 | 12/2016 | Minvielle |
| 2017/0027339 A1 | 2/2017 | Chang et al. |
| 2017/0046991 A1 | 2/2017 | Riegel |
| 2017/0124603 A1 | 5/2017 | Olson |
| 2017/0147971 A1 | 5/2017 | Morse et al. |
| 2017/0213184 A1 | 7/2017 | Lee et al. |
| 2017/0228776 A1* | 8/2017 | Walden .............. G06Q 30/0255 |
| 2017/0329078 A1 | 11/2017 | Dunn et al. |
| 2018/0020847 A1 | 1/2018 | Dunn et al. |
| 2018/0053226 A1 | 2/2018 | Hutton et al. |
| 2018/0061283 A1 | 3/2018 | Kim et al. |
| 2018/0103778 A1 | 4/2018 | Olovsson |
| 2018/0125404 A1* | 5/2018 | Bott ........................ G06F 3/013 |
| 2018/0226056 A1 | 8/2018 | Chan |
| 2018/0268367 A1 | 9/2018 | Bryan et al. |
| 2018/0335252 A1 | 11/2018 | Oh |
| 2018/0365630 A1 | 12/2018 | Seals et al. |
| 2019/0050900 A1 | 2/2019 | Avakian |
| 2019/0122263 A1 | 4/2019 | Avakian |
| 2019/0149725 A1 | 5/2019 | Adato et al. |
| 2019/0156273 A1 | 5/2019 | Fisher et al. |
| 2019/0213545 A1 | 7/2019 | Adato et al. |
| 2020/0286032 A1 | 9/2020 | Bogolea et al. |

FOREIGN PATENT DOCUMENTS

| | | | |
|---|---|---|---|
| DE | 10205405 A1 | 8/2003 | |
| DE | 102009003127 A1 | 11/2010 | |
| DE | 102015203150 A1 | 8/2016 | |
| EP | 2194222 A2 | 6/2010 | |
| EP | 2843336 A1 | 3/2015 | |
| EP | 3379184 A1 | 9/2018 | |
| EP | 3740103 A1 | 11/2020 | |
| JP | 2001294308 A | 10/2001 | |
| JP | 2003125904 A | 5/2003 | |
| JP | 3450907 B2 * | 9/2003 | |
| JP | 2004183987 A | 7/2004 | |
| JP | 2006209550 A | 8/2006 | |
| JP | 2012161413 A | 8/2012 | |
| JP | 2014206320 A | 10/2014 | |
| JP | 2015169412 A | 9/2015 | |
| JP | 2015222138 A | 12/2015 | |
| JP | 2016533544 A | 10/2016 | |
| JP | 2018151923 A | 9/2018 | |
| KR | 20120044874 A | 5/2012 | |
| KR | 20150093289 A | 8/2015 | |
| KR | 20170033083 A | 3/2017 | |
| WO | 9838547 A1 | 9/1998 | |
| WO | 03025805 A1 | 3/2003 | |
| WO | WO-03025805 A1 * | 3/2003 | ........... G06Q 10/087 |
| WO | 2009152078 A1 | 12/2009 | |
| WO | 2014165171 A2 | 10/2014 | |
| WO | WO-2014175643 A1 * | 10/2014 | .............. F25D 11/00 |
| WO | 2015095493 A1 | 6/2015 | |
| WO | WO-2016183302 A1 * | 11/2016 | ........... G06F 1/3212 |
| WO | 2017127035 A1 | 7/2017 | |
| WO | 2019032893 A1 | 2/2019 | |

OTHER PUBLICATIONS

Jul. 28, 2021—(EP) Office Action—EP19900402.9.
Jul. 22, 2021—(KR) Office Action—10-2020-7006998.
Advertising with Transparent LCD Displays; Jul. 28, 2016; URL: http://www.displays2go.com/Article/Advertising-Transparent-LCD-Displays-78>.
htttp://emotivev.com/products; at least as early as Jun. 5, 2017.
https://www.youtube.com/watch?v=2tlM9lereLc; at least as early as Jun. 5, 2017, "Digital Signage Transparent LCD Beverage Cooler Demo".
Oct. 24, 2018—(WO) International Search Report and Written Opinion—App PCT/US2018/046103.
Extended EP Search Report for EP 12782036, dated Jun. 9, 2015, 7 Pages.
(US) Notice of Allowance on U.S. Appl. No. 14/170,378, Dated Mar. 31, 2015, 10 Pages.
File History of U.S. Appl. No. 16/547,288, filed Aug. 21, 2019.
File History of U.S. Appl. No. 15/888,210, filed Feb. 5, 2018.
File History of U.S. Appl. No. 14/819,257, filed Aug. 5, 2015, (U.S. Pat. No. 9,504,338).

(56) References Cited

OTHER PUBLICATIONS

File History of U.S. Appl. No. 14/686,958, filed Apr. 15, 2015, (U.S. Pat. No. 9,155,405).
File History of U.S. Appl. No. 14/170,378, filed Jan. 31, 2004, (U.S. Pat. No. 9,052,536).
File History of U.S. Appl. No. 13/286,053, filed Oct. 31, 2011, (U.S. Pat. No. 8,683,745).
File History of U.S. Appl. No. 61/484,616, filed May 10, 2011.
International Search Report of PCT/US19/66869 dated Mar. 16, 2020.
Written Opinion of PCT/US19/66869 Dated Feb. 11, 2020.
May 26, 2022—(KR) Notice of Allowance App 10-2020-7006998.
Jun. 3, 2021—(WO) International Search Report and Written Opinion—App PCT/US2021/013247.
May 4, 2022—(WO) International Preliminary Examination Report (Chapter II)—App PCT/US2021/013247.
Written Opinion of the International Search Report of PCT/US19/66869 Dated Mar. 16, 2020.
Jul. 27, 2020—(TW) Search Report App 108146270.
Jul. 29, 2020—(TW) Office Action—App 108146270—Eng Tran.
Nov. 19, 2020—(EP) Search Report—U.S. Appl. No. 18/843,780.
Neff, J., "New System Puts Video Ads on Sotre Cooler Doors", (2015), AdAge, http://adage.com/article/cmo-strategy/system-puts-video-ads-store-cooler-doors/301395, pp. 1-3.
Jul. 1, 2020—(US) Notice of Allowance—U.S. Appl. No. 16/222,643.
Jun. 1, 2021—(TW) Notice of Allowance Application No. 108146270.
Jun. 3, 2021—(TW) Search Report Application No. 108146270.
Jul. 18, 2022—(EP) Search Report—App. No. EP19900402.9.
Jun. 17, 2022—(TW) Search Report—App. No. 110132225 with English Translation.
Dec. 20, 2022—U.S. Non-Final Office Action—U.S. Appl. No. 16/741,581.
Jan. 9, 2023—U.S. Notice of Allownace—U.S. Appl. No. 15/931,971.
Oct. 12, 2022—(CA) Office Action—App 3,123,879.
Nov. 18, 2022—(EP) Office Action—App 18843780.0.
Jan. 13, 2023—(CN) Office Action—App 201880064016.5.
Jan. 31, 2023—(TW) Search Report—App 110132225.
Apr. 4, 2023—U.S. Notice of Allowance—U.S. Appl. No. 16/741,581.
Mar. 24, 2023—U.S. Notice of Allowance—U.S. Appl. No. 17/082,270.
Jul. 5, 2023—(CN) First Office Action—App 202180011384.5.
Jul. 6, 2023—(JP) Office Action—App. No. 2020-520519.
Jul. 25, 2023—(CA) Office Action—App. No. 3,123,879.

* cited by examiner

FIG. 4
FIG. 5
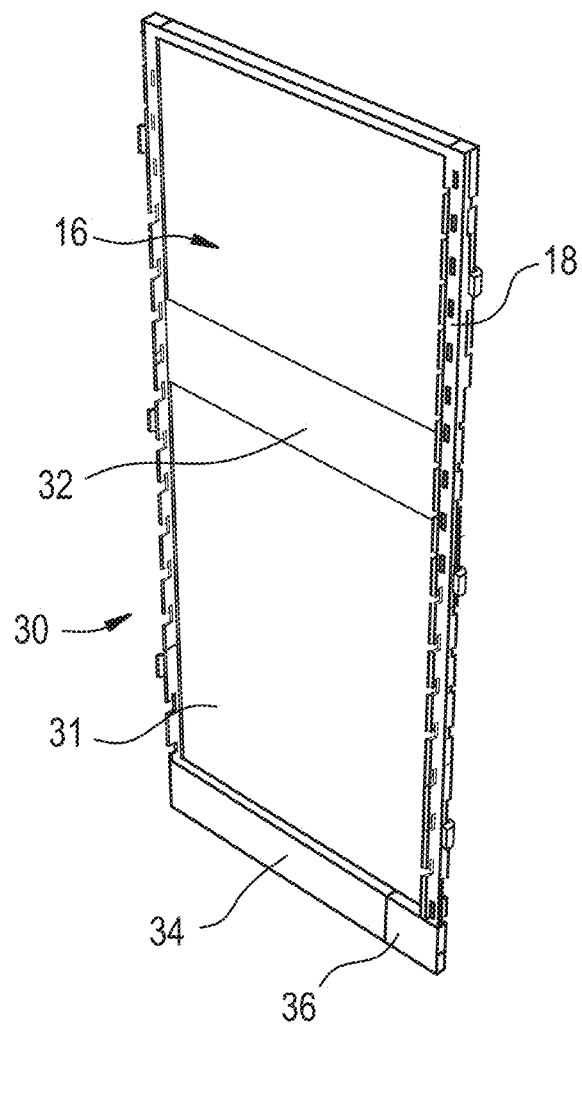
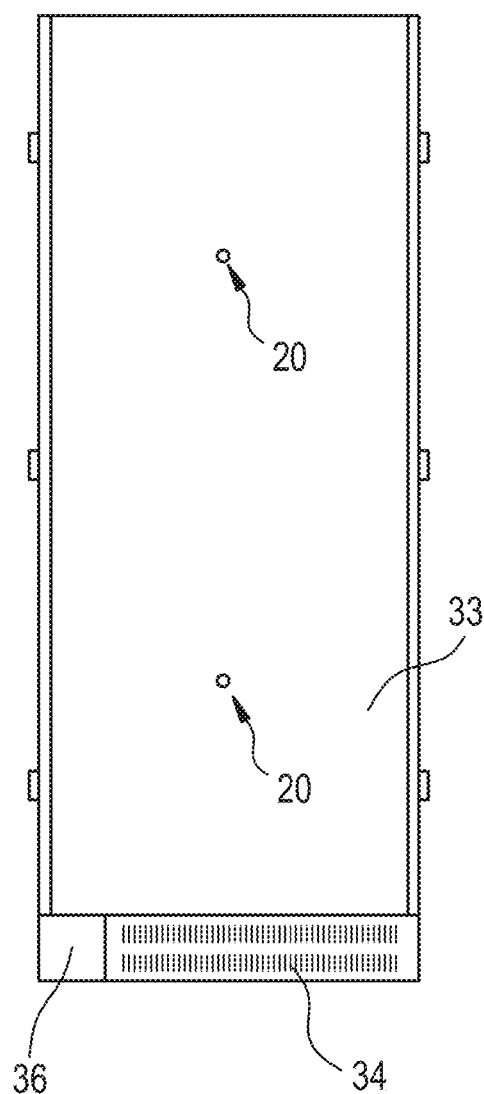

System Architecture: Display array with sensors and cameras driven by Remote/Networked video controllers and encased in protective enclosure

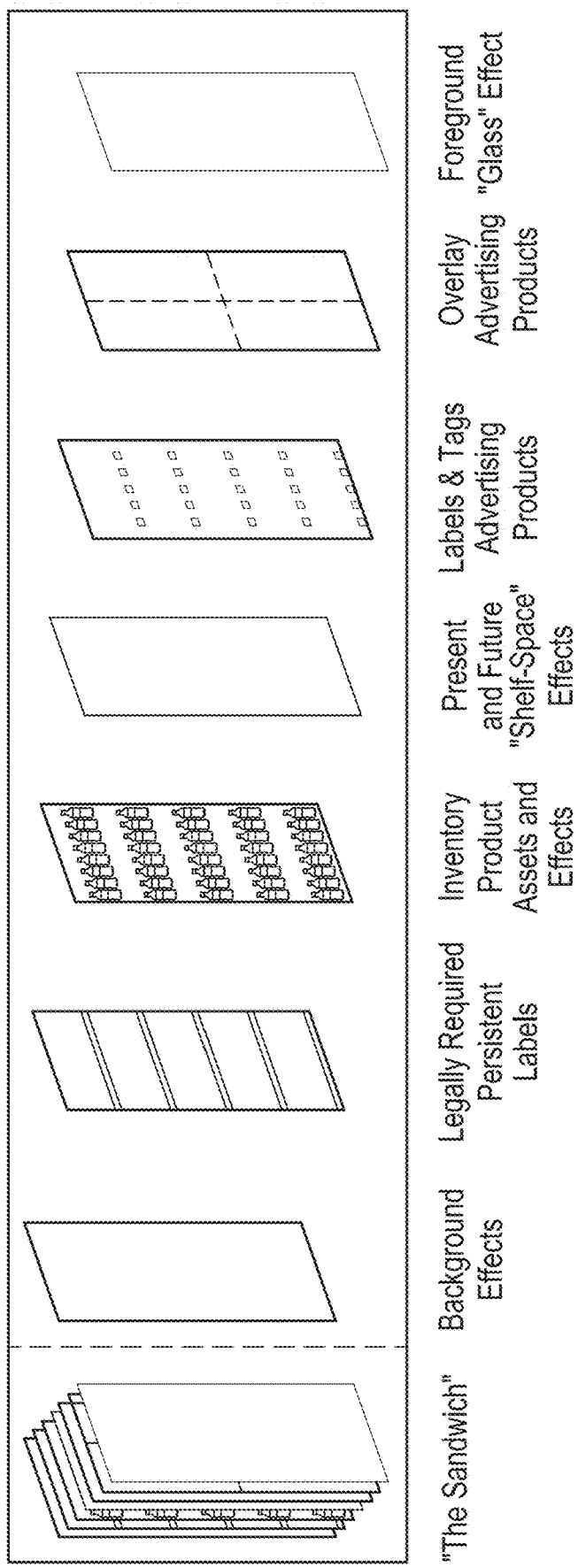

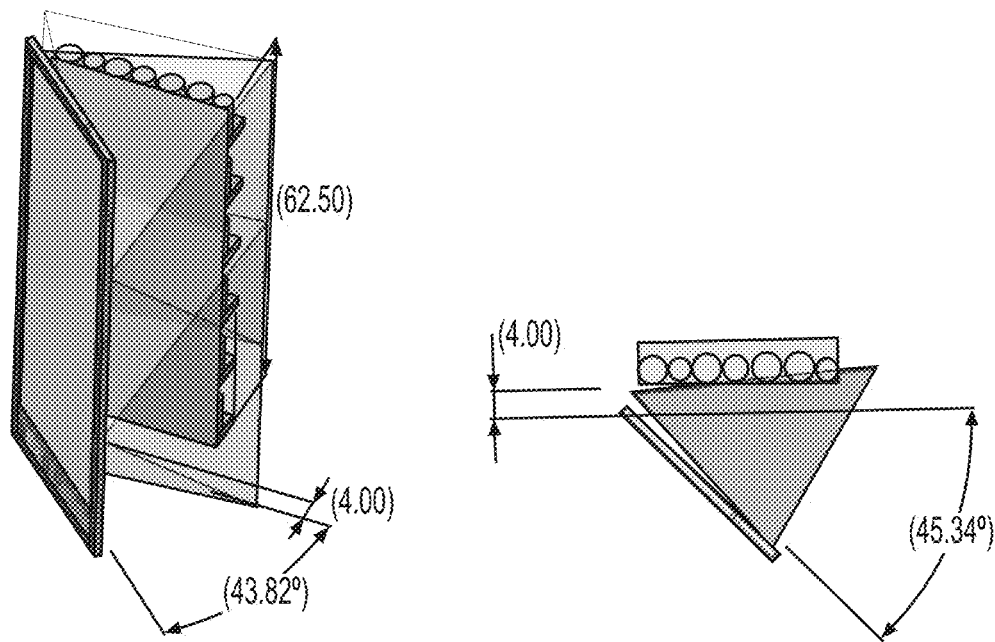
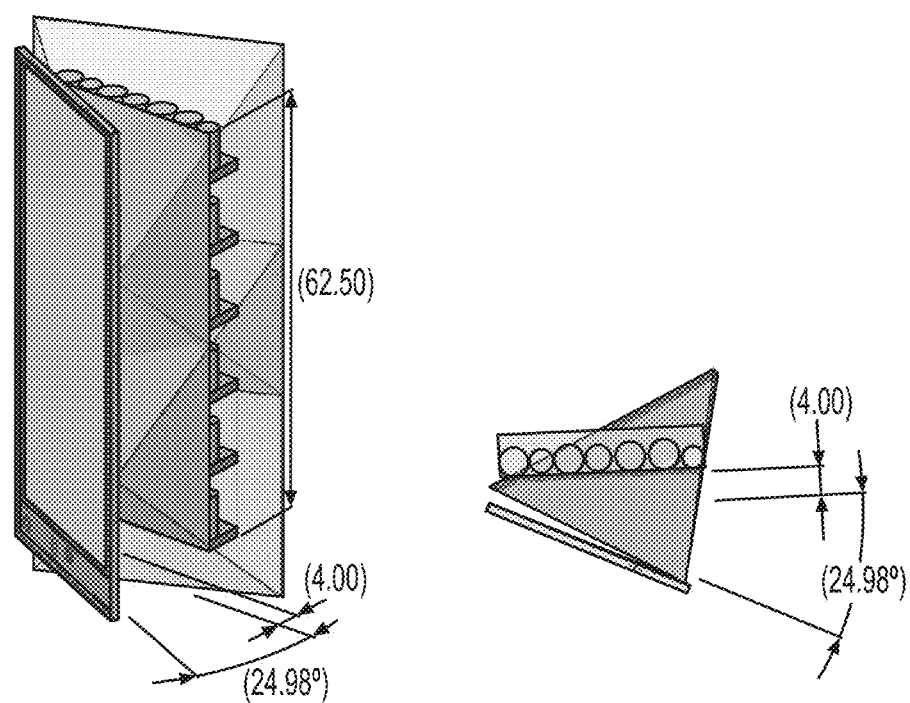
FIG. 15

INTELLIGENT MARKETING AND ADVERTISING PLATFORM

RELATED APPLICATION

This application is a 35 USC 371 National Phase of International Patent Application No. PCT/US2019/066869 (filed Dec. 17, 2019, which is a continuation-in-part claiming the priority filing date of U.S. patent application Ser. No. 16/222,643 (filed Dec. 17, 2018 and issued Sep. 8, 2020 as U.S. Pat. No. 10,769,666), which is a continuation-in-part of U.S. patent application Ser. No. 15/674,198 (filed Aug. 10, 2017 and issued Jun. 2, 2020 as U.S. Pat. No. 10,672,032) and a continuation-in-part of International Patent Application No. PCT/US18/46103 filed Aug. 9, 2018, and all of the aforementioned are hereby incorporated herein by reference in their entireties.

BACKGROUND

The present invention generally relates to merchandising solutions, and more specifically relates to an intelligent marketing and advertising platform which employs digital "smart" screens on retail product containers thereby providing an innovative advertising solution.

Although more and more people are purchasing items online, brick and mortar retail sales are still substantial and are, in fact, growing in certain market segments such as grocery, drug and convenience stores. Over 75 percent of shopping in brick and mortar stores is impulse purchasing. Research shows that impulse decisions are highly influenced by in-store messaging, and that most of that in-store impulse shopping occurs at retail product containers, such as coolers and freezers.

If impulse shopping behavior can be disrupted by what is displayed on a retail product container, such as cooler or freezer doors, this would present an enormous value creation opportunity for both consumer packaged goods brands and retailers. Arguably, coolers are the most overlooked, least promoted, least technology sophisticated and one of the most operationally challenged sections of a retail store.

Conventional retail product containers such as coolers, freezers, vending machines, etc. have a glass panel or door through which a customer views products stored in the retail product container and which are available for purchase. Problems with this approach include the fact that oftentimes products stored therein are not neatly presented, products are blocked by other products such that a customer cannot easily see what products are available for purchase, etc. Still further, store employees are required to maintain the appearance of the products stored therein, keep track of stock, install and swap out promotional tags and other displays (such as displays relating to pricing and promotions) in order to keep those items current.

It is a well-understood problem that coolers and refrigerators in grocery stores are one area that is difficult for brands to conduct effective "on-the-spot" advertisements and promotions. Typically, brands rely on other advertising medias (e.g. print, billboards, online and TV advertisements, etc.) to promote products that are retailed on the shelves of coolers/freezers and/or refrigerators at retail and convenience stores. It is also widely acknowledged that current advertising efforts are not effective and impactful. Recognizing these inefficiencies several display manufacturers explored opportunities to convert the "see-thru" glass windows on the cooler doors into transparent displays that can enable running ads while the shoppers still see the products and continue their usual shopping experience. Transparent display technology that was being developed started to be targeted for these applications and were eventually integrated into cooler doors by several manufacturers. These systems allowed the conversion of these "passive" doors into an advertising platform while minimally disrupting a typical consumer shopping experience. The consumer could still see through and select the items they plan to pick; while the store owners or media platform owners can run promotional videos and advertisements on transparent display media. However, over the last few years it was evident that the market penetration of such systems has been very slow. There are a number of factors that have worked to limit adoption, such as:

1) the technology very expensive, requiring prohibitively-high up-front costs;
2) the overall visuals/aesthetics are not appealing to the consumer; and
3) lack of wide-spread adoption prevents the operators of bringing significant advertising revenues to justify business case.

Brands always seek media platforms that enable them to reach the critical mass of their target customer. For digital signage media platforms, this translates to a need for a very significant installed base.

SUMMARY

An object of an embodiment of the present invention is to provide an intelligent marketing and advertising platform.

Briefly, an embodiment of the present invention provides an intelligent marketing and advertising platform which comprises a plurality of retail product containers (such as coolers, freezers and/or vending machines). Each retail product container has internal storage volume, and each comprises at least one non-transparent display which prohibits viewing of the internal storage volume of the retail product container. Each retail product container further comprises customer-detecting hardware and inventory-taking hardware.

The platform also comprises a controller/data collector which is in communication with the retail product containers. The controller/data collector is configured to control the at least one non-transparent display of each retail product container such that each non-transparent display provides a planogram relating to retail products physically contained in the internal storage volume of the retail product container based on inventory taken by the controller/data collector using the inventory-taking hardware of the retail product container.

The controller/data collector is preferably configured to control the at least one non-transparent display of each retail product container to display current pricing information regarding products physically contained in the internal storage volume of the retail container, wherein the pricing is dictated by the controller/data collector.

The controller/data collector is preferably configured to detect customers using the customer-detecting hardware, and is configured to display promotions on the at least one non-transparent display of each retail product container based on what is detected by the controller/data collector using the customer-detecting hardware.

The intelligent marketing and advertising platform provides an innovative merchandising solution for retailers by effectively transforming the glass surface of retail product containers (such as cooler doors) into a non-transparent display of planograms. The merchandising solution disclosed herein provides for digital planograms and pricing management, real time promotional updates and sales data, etc. The advertising method innovation for in-store retail signage disclosed herein is effectively accomplished by converting/transforming the simple glass surface of a retail product container (such as cooler/freezer doors) into digital "smart" screens that provide for innovative advertising solutions.

BRIEF DESCRIPTION OF THE DRAWINGS

The organization and manner of the structure and operation of the invention, together with further objects and advantages thereof, may best be understood by reference to the following description taken in connection with the accompanying drawings wherein like reference numerals identify like elements in which:

FIG. 4 illustrates the front of a door of a retail product container;

FIG. 5 is similar to FIG. 4, but illustrates the back of the door;

FIG. 9 illustrates a "sandwich" of layers of possible content for the display disclosed herein;

FIG. 15 shows different views of a retail product container and/or door from a front view and top view when the door is open.

DESCRIPTION OF AN ILLUSTRATED EMBODIMENT

Figure 1:
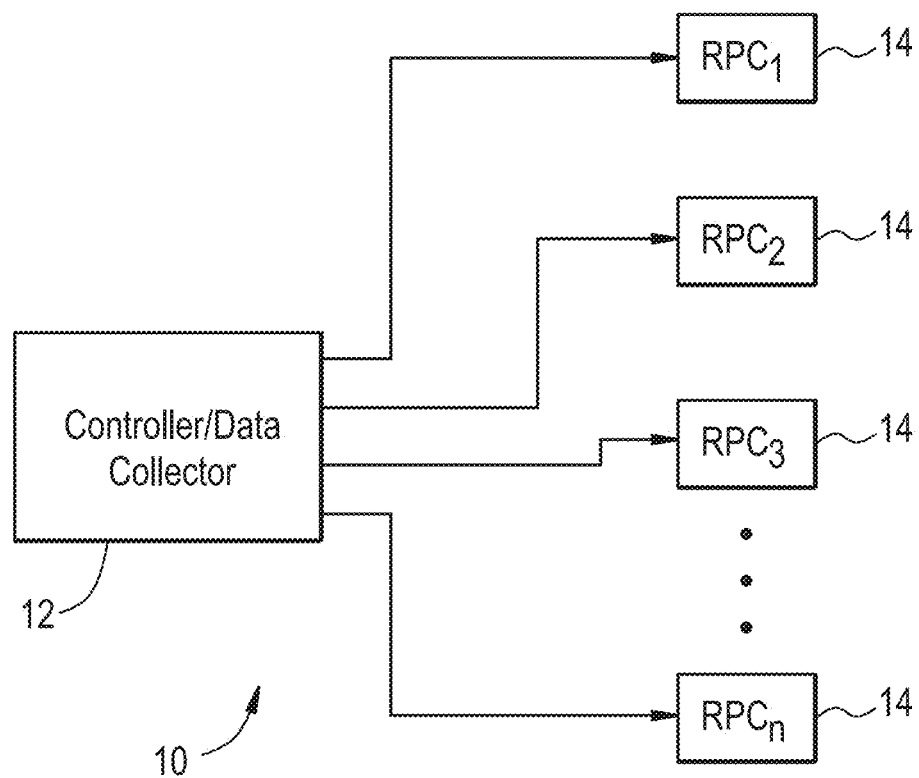
FIG. 1 illustrates an intelligent marketing and advertising platform which provides that a controller/data collector is networked with a plurality of retail product containers.

While this invention may be susceptible to embodiment in different forms, there is shown in the drawings and will be described herein in detail, a specific embodiment with the understanding that the present disclosure is to be considered an exemplification of the principles of the invention, and is not intended to limit the invention to that as illustrated.

FIG. 1 illustrates an intelligent marketing and advertising platform 10 which in accordance with an embodiment of the present invention. As shown, the intelligent marketing and advertising platform 10 provides that a controller/data collector 12 is networked with a plurality of retail product containers 14.

The retail product containers 14 need not be the same, but preferably each is a device such as a cooler, freezer and/or vending machine. Regardless, preferably each has internal storage volume in which products for purchase can be stored.

Figure 2:
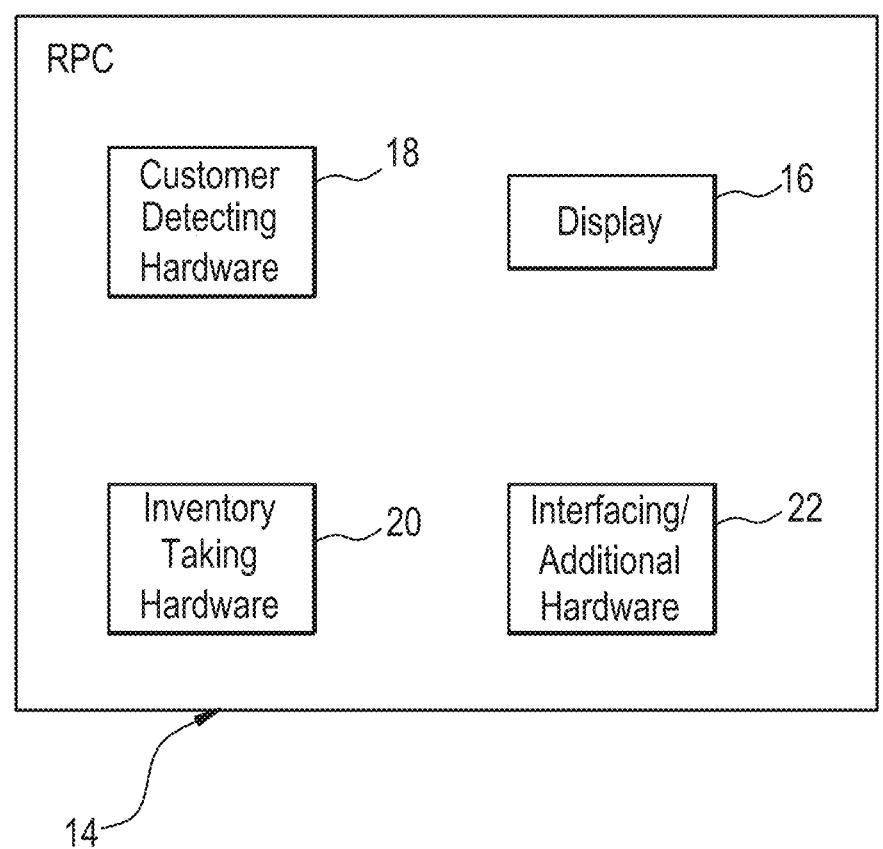
FIG. 2 illustrates some of the components of one of the retail product containers of the intelligent marketing and advertising platform illustrated in FIG. 1.

A shown in FIG. 2, preferably each retail product container 14 comprises at least one display 16, such as a display on a door of the retail product container 14. Preferably, the display 16 comprises a non-transparent display which prohibits customers from viewing, through the display, products which are being stored in the internal storage volume. The display 16 can comprise, for example, a touchscreen LCD with which customers can interact.

Preferably, each retail product container 14 further comprises customer-detecting hardware 18, such as one or more proximity sensors (such as heat maps), cameras, facial sensors or scanners, and eye-sensors (i.e., iris-tracking sensors).

Assuming cameras are employed, preferably cameras are mounted on doors of the retail product containers 14. Preferably, the cameras have a depth of field of view of twenty feet or more, and have a range of field of view of 170 degrees with preferably 150 degree of facial recognition ability. Preferably, software is employed in association with the cameras to monitor shopper interactions, serve up relevant advertisement content on the displays 16, and track advertisement engagement in-store. The controller/data collector 12 may be configured to independently control each camera, as well as collectively control a plurality of displays 16, to serve up single-screen and/or multiple screen content and interactions. Preferably, the controller/data collector 12 and displays 16 are configured to allow for both banner advertisements and full-screen advertisements to be displayed at the same time on a single display 16.

Preferably, each retail product container 14 further comprises inventory-taking hardware 20 such as additional cameras and/or sensors that are disposed inside the retail product container 14 and face the products.

As shown in FIG. 1, the controller/data collector 12 is networked (preferably a cloud network) with the retail product containers 14, such as via conventional means, such the Internet, Bluetooth, etc., via wired Ethernet, wireless LAN or a cellular network. The controller/data collector 12 is configured to control the displays 16 of the retail product containers 14, as well as is configured to receive information from the retail product containers 14, such as information from the displays 16 (such as information regarding touchscreen interactions), as well as information from the customer-detecting hardware 18 and inventory-taking hardware 20 of the retail product containers 14. As shown, each retail product container 14 includes interfacing/additional hardware 22 which is configured to facilitate, among other things, the networking and transfer of information (i.e., data) between the controller/data collector 12 and the retail product container 14 and overall control and function of the display 16, customer-detecting hardware 18 and inventory-taking hardware 20.

The controller/data collector 12 may comprise a server having one or more processors, memory storage, a user interface, etc. and is configured to not only dictate what is displayed on the displays 16 of the retail product containers 14 and receive information and data from the retail product containers 14, but is also preferably configured to perform analytics based on information and data which has been received.

Preferably, the controller/data collector 12 is configured to control the display 16 of each retail product container 14 such that each display 16 provides planograms relating to retail products physically contained in the internal storage volume of the retail product container 14 (but not viewable through the display 16) based on inventory taken by the controller/data collector 12 using the inventory-taking hardware 20 of the retail product container 14. As such, there is no downside to the fact that, in reality, products stored in the retail product container 14 may not be neatly stored therein, or that products stored therein may be blocked from view by other products stored therein. The planograms which are displayed on the displays 16 of the retail product containers 14 effectively optimize what is presented to the customer.

Preferably, the controller/data collector 12 is configured to control the display 16 of each retail product container 14 to display current pricing information regarding products physically contained in the internal storage volume of the retail product container 14, wherein the pricing is dictated by the controller/data collector 12.

Preferably, the controller/data collector 12 is configured to detect customers using the customer-detecting hardware 18, and is configured to display promotions on the at least display 16 based on what is detected by the controller/data collector 12 using the customer-detecting hardware 18.

As discussed above, the controller/data collector 12 effectively takes an inventory of each retail product container 14 (i.e., using the inventory-taking hardware 20 along with image recognition software). Preferably, the controller/data collector 12 is configured to transmit data to a distributor and/or store regarding overall stock relating to the inventory of the plurality of retail product containers 14. More specifically, the overall system can be configured to issue restock notifications, provide merchandising updates, pricing management, real time sales data and behavioral consumer analytics. As such, the system provides advertising, flawless merchandising, real time pricing and promotions, an inventory and direct store delivery solution and the power of analytics.

It should be noted that FIG. 2 only depicts some of the components of a retail product container 14 and the retail product container 14 will inevitably include other components, such as possibly a refrigeration unit, etc. which are not specifically relevant to the present invention.

Preferably, a plurality of retail product containers 14 and associated displays 16 are arranged side-by-side down an aisle of a retail store, such as a grocery store, and the controller/data collector 12 is configured to operate the displays 16 depending on what is detected by both the customer-detecting hardware 18 and inventory-taking hardware 20.

For example, preferably the controller/data collector 12 is configured to operate the displays 16 such that the displays 16 display full screen advertisements if no motion is detected (or motion is no longer detected) by the customer-detecting hardware 18. In other words, as a customer is approaching an aisle, the customer sees full screen advertisements on the displays 16.

Preferably, the controller/data collector 12 is configured such that if motion is detected within twenty feet of a retail product container 14 (i.e., by customer-detecting hardware 18) mounted on the door of that retail product container 14), the controller/data collector 12 operates that particular display 16 to stop displaying a full screen advertisement, and instead display a planogram of products which are located inside the retail product container 14. Preferably, banner advertisements and pricing tags are also loaded and displayed at the same time. Preferably, the controller/data collector 12 is configured to manage merchandising advertising objects and layers. This can be facilitated and managed remotely, or locally at an individual retail location such as by using a content management application.

Preferably, the controller/data collector 12 is configured such that as a shopper approaches closer to a given retail product container 14, the display 16 associated with the retail product container 14 changes again. For example, the display 16 can change such that it then displays labels (e.g., organic, non-gmo, etc.) and tags (e.g., sale with local card, locally made, trending, etc.). These promotional labels and tags can be activated via the controller/data collector 12 and can be either selected from a pre-determined set of static animated icons, or they can be customized by the retailer and/or brands based on their business and marketing needs. The controller/data collector 12 can be configured to incorporate customer rating scores (e.g., 1-5 stars, trending, favorites, etc.) using one or more consumer review sources.

Preferably, the controller/data collector 12 is configured such that as a shopper stands or lingers in front of a given retail product container 14, the display 16 associated with the retail product container 14 changes yet again. At this point, preferably the controller/data collector 12 has been able to use the customer-detecting hardware 18 to effectively learn more about that particular customer, such as gender, age, mood, etc. The controller/data collector 12 is configured to take what has been detected about the customer to determine which advertisement and other information to present to that particular customer on the display 16 associated with the retail product container 14 in front of which the customer is standing. By tracking shopper data in parallel with which advertising content is being served on all displays 16 within the viewing range of the shopper, the retailer and the brands are better served, providing new influence opportunities at the moment of purchasing decision, optimizing marketing spend and generating new revenue streams.

Preferably, the controller/data collector 12 and displays 16 are configured such that, while a shopper is standing in front of a given display 16 (as detected by a camera mounted on a door of that particular retail product container 14) relevant conditional ads are displayed on that display 16 such as real-time data relating to news events, weather, sporting events, etc. (i.e., in addition to information and advertisements relating to the contents of the retail product container 14, such as banner advertisements, horizontal advertisements, full screen advertisements, tags, labels, spot advertisements, etc.).

As discussed above, preferably the controller/data collector 12 is configured to keep track of the inventory of a given retail product container 14 by using inventory-taking hardware 20, such as one or more cameras and/or sensors on the inside of the retail product container 14. Preferably, when the controller/data collector 12 has determined that a given product is out of stock, the controller/data collector 12 takes this into consideration when controlling what is displayed on the display 16 of that particular retail product container 14. For example, out of stock artwork can be displayed and/or advertisements can be swapped, such that out of stock advertising opportunities can be sold to different brands, wherein certain advertisements are displayed given certain out of stock scenarios.

Figure 3:
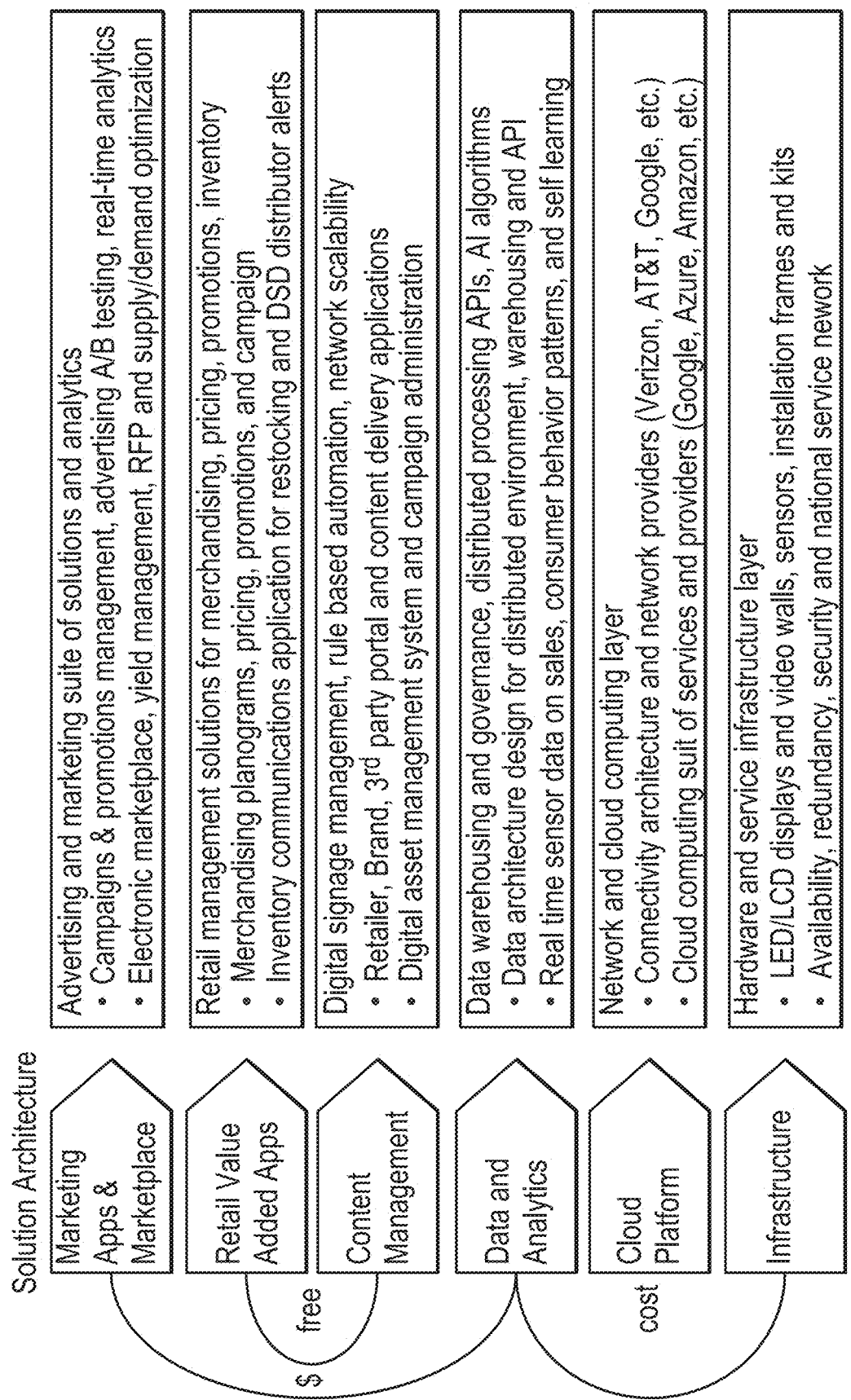
FIG. 3 illustrates the hardware stack of the intelligent marketing and advertising platform.

FIG. 3 illustrates the hardware stack of the platform. As shown, the hardware stack consists of an LCD display (i.e., display 16), display content supplied via dedicated PC-based media players, connected to the network via Edge router and equipped with smart IOT devices (i.e., cameras and sensors). The diagram shown in FIG. 6 describes the system configuration diagram and flow chart of the advertisement content and key hardware components involved. Preferably, proprietary UI/UX content products are generated, that are managed centrally (remotely) via network. This will help manage the media scheduling and any layout modifications remotely.

Additionally, preferably all inputs collected by the IOT devices will be analyzed locally as well as remotely (via cloud) to provide the feedback inputs for the system to push more relevant/targeted content, tailored for the consumer. The analytics are preferably conducted anonymously, images captured by cameras are preferably processed to collect statistics on consumer demographic characteristics: (such as age and gender). This data is preferably subsequently analyzed for additional statistics for the retailers that are valuable for in-store merchandise layout design and smart merchandizing, including the ability to track the shoppers "traffic" areas, known as "heat maps", areas were customers would concentrate more and spend more time exploring, etc.

Preferably, the interior facing cameras are utilized to ensure that products on the shelves are constantly monitored for out-of-stock warning. When a product is sold out, the signal preferably alerts the system to update the layout on the display as well as the store operator.

Preferably, by default, the platform is preferably programmed to run full screen advertisements. Customer-facing cameras are programmed to have motion detection capability, analyze an approaching customer, and switch the system to display planograms of products placed on the shelves. Further analytics based on the images captured by these cameras preferably triggers tailored promotional ads.

Preferably, at least a portion of the display is configured to have interactive touch capability, enabling the shoppers to explore further detailed information about various products, while minimizing the interference with other shoppers who would be able to see all the products displayed on the planogram and be able to proceed and pick up the product of their choice.

The system may be configured to track eye movements of the consumer (such as by using powerful software tools coupled with specific hardware that uses infrared sources to track eye movements) and correlate gaze spots with advertisements. This amounts to a very powerful demonstration tool to measure the success of the advertisement and its ability to impact the decision of the shopping consumer.

As discussed above, preferably each retail storage container 14 has a door and a display 16 is mounted on that door along with customer-detecting hardware 18, such as one or more proximity sensors (such as heat maps), cameras, facial sensors or scanners, and eye-sensors (i.e., iris-tracking sensors). FIG. 4 illustrates the front 31 of the door 30 providing the display 16 and the customer-detecting hardware 18, such as a camera. As shown, preferably the display 16 is in the form of an LCD panel comprising one or more touch zones 32 which are interactive by the customer. An access panel 34 may be provided proximate the bottom of the door 30 along with a media player 36. Although not specifically shown, a protective panel may be generally mounted over the display 16.

As shown in FIG. 5, cameras or other types of sensors (i.e. inventory-taking hardware 20) may be provided on the back 33 of the door 30 which the controller/data collector 12 (shown in FIG. 1) can use to keep track of inventory regarding the interior contents of the retail product container 14.

The intelligent marketing and advertising platform provides an innovative merchandising solution for retailers by effectively transforming the glass surface of retail product containers (such as cooler doors) into a non-transparent display of planograms. The merchandising solution disclosed herein provides for digital planograms and pricing management, real time promotional updates and sales data, etc. The advertising method innovation for in-store retail signage disclosed herein is effectively accomplished by converting/transforming the simple glass surface of a retail product container (such as cooler/freezer doors) into digital "smart" screens that provide for innovative advertising solutions.

As a business model, the cooler doors of a retail store can be retrofit with "smart" cooler doors having displays, cameras and sensors that collectively measure, react, learn and communicate in order to optimize the metrics.

The intelligent marketing and advertising platform disclosed herein effectively prides for at least the following: the convergence of a brick and mortar retail establishment with e-commerce; in-store promotions as an electronic marketplace; real time and algorithmic-driven pricing and promotions; self-learning/machine-learning artificial intelligence algorithm-driven advertising which is personalized to a given consumer; behavior response and external data (i.e. weather, events, competition, etc.); and smart-sensor and digital merchandising for planogram compliance, automatic-restock, in-store audits, etc.

The advertising method for in-store retail signage disclosed herein effectively employs two primary technologies—large scale brand/product advertising rotations and planogram screens (preferably activated when a customer gets within three feet) with non-obtrusive ad banners or hot-spots.

Figure 6:
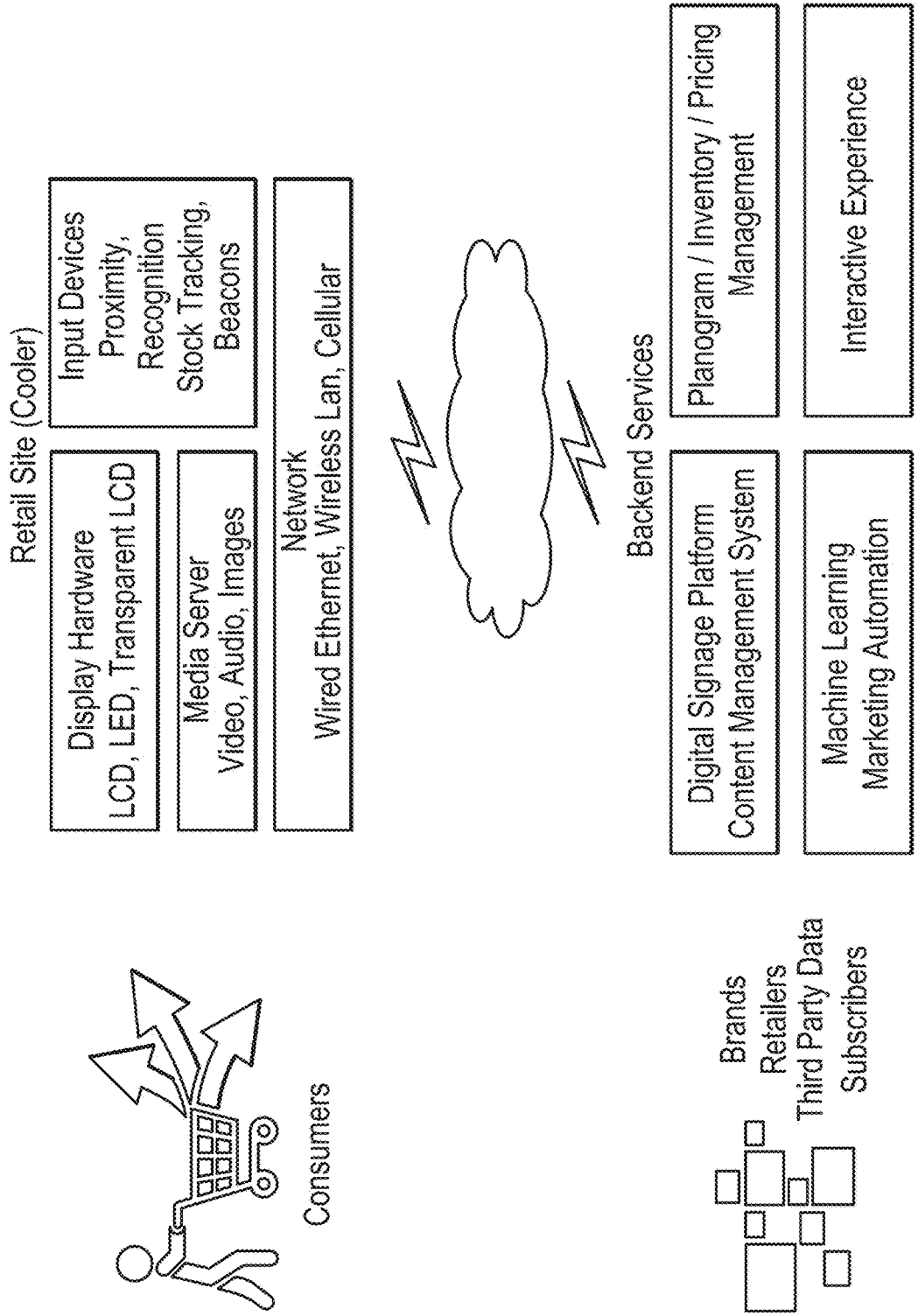
FIG. 6 illustrates solution architecture of the intelligent marketing and advertising platform.
Figure 7:
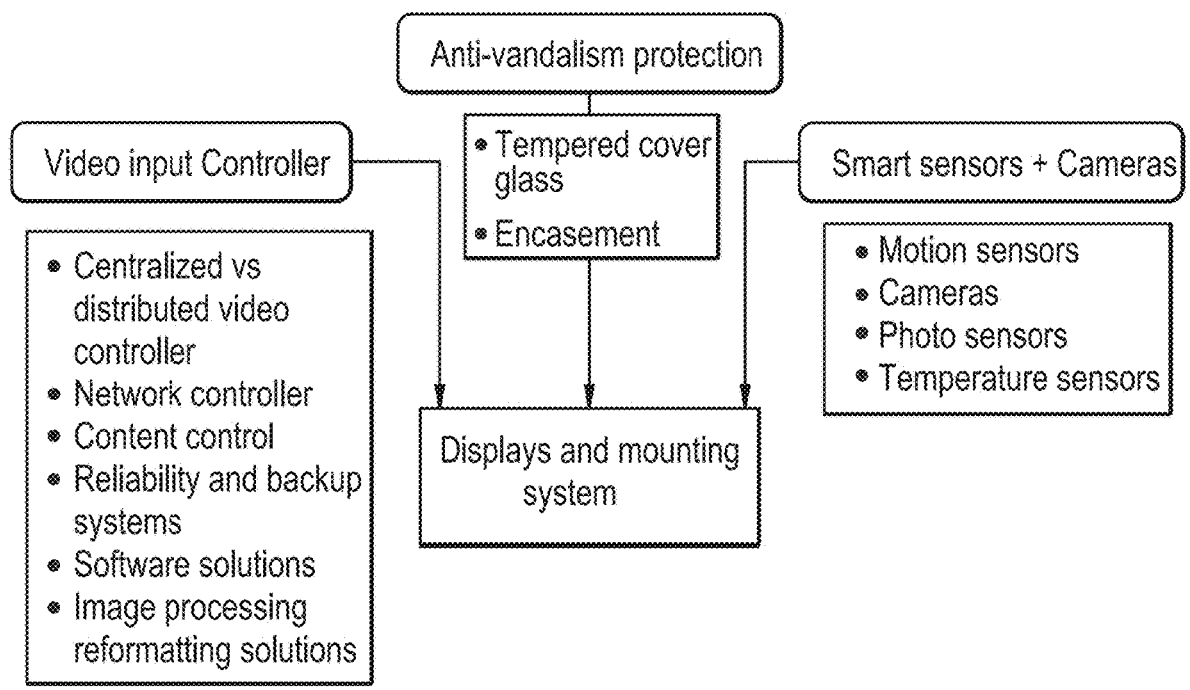
FIG. 7 illustrates one possible platform stack of the intelligent marketing and advertising platform.
Figure 8A:
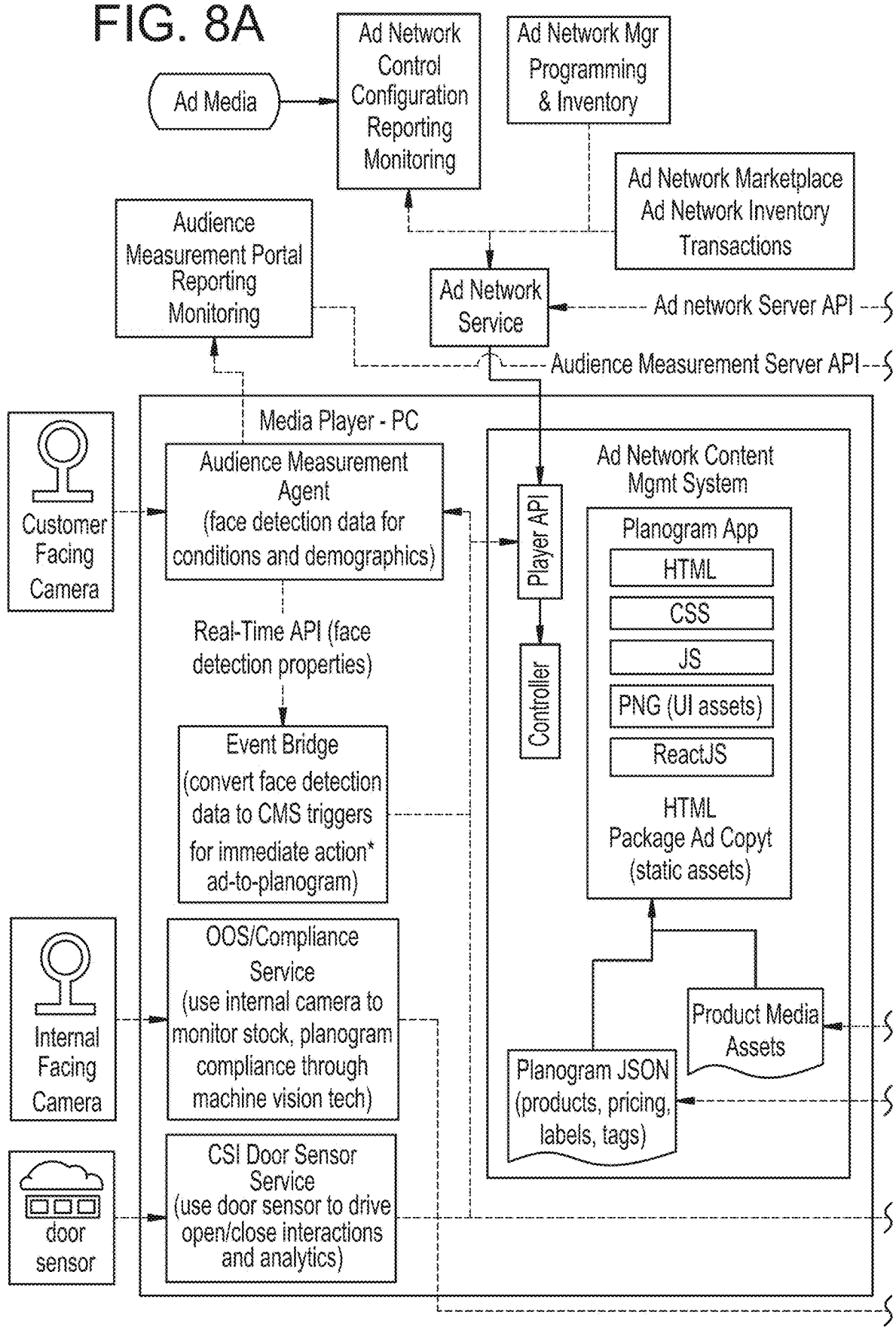
FIG. 8 (the left half of which is FIG. 8A and the right half of which is FIG. 8B) illustrates one possible system architecture which can be implemented in connection with the present invention.
Figure 8B:
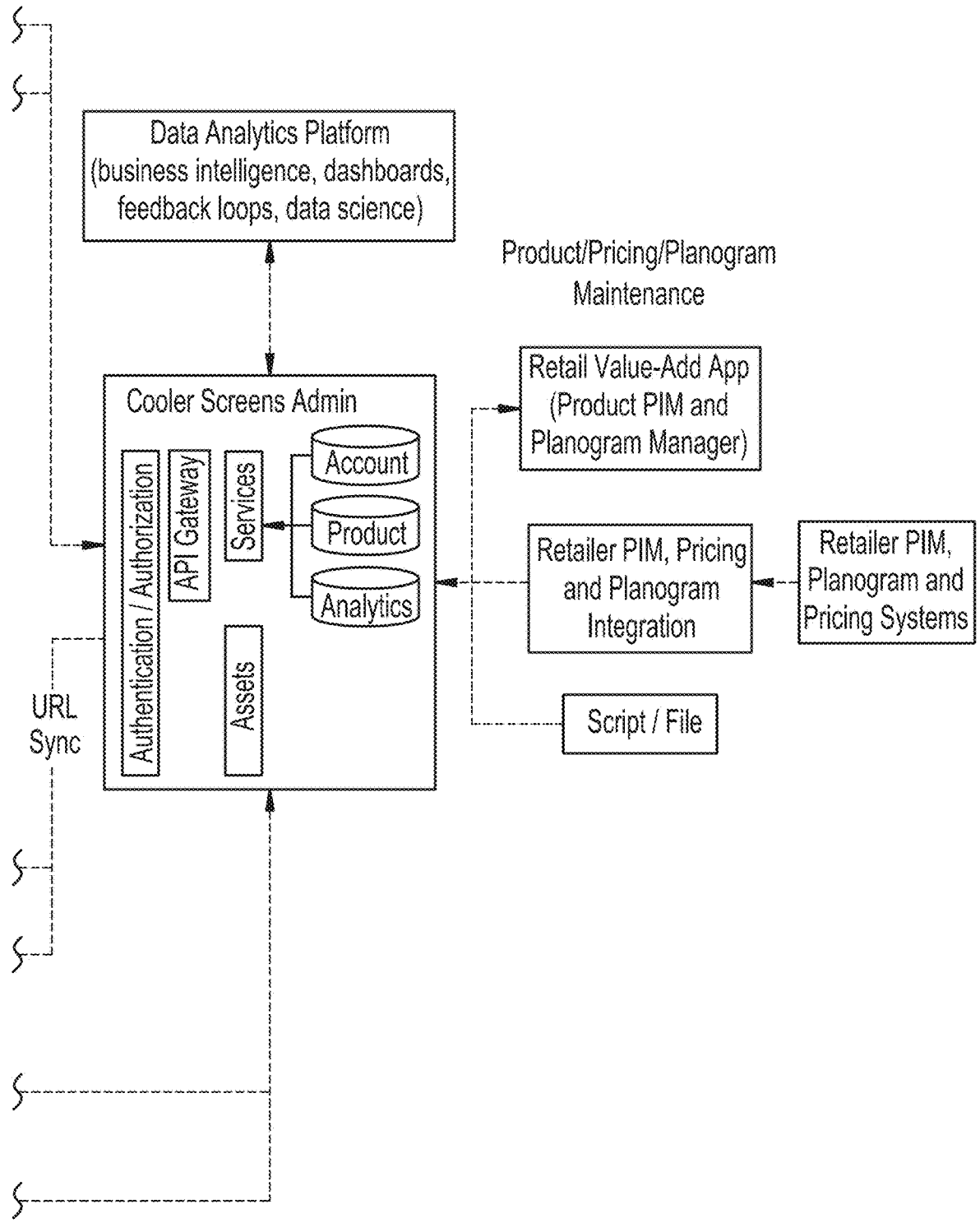
Figure 10:
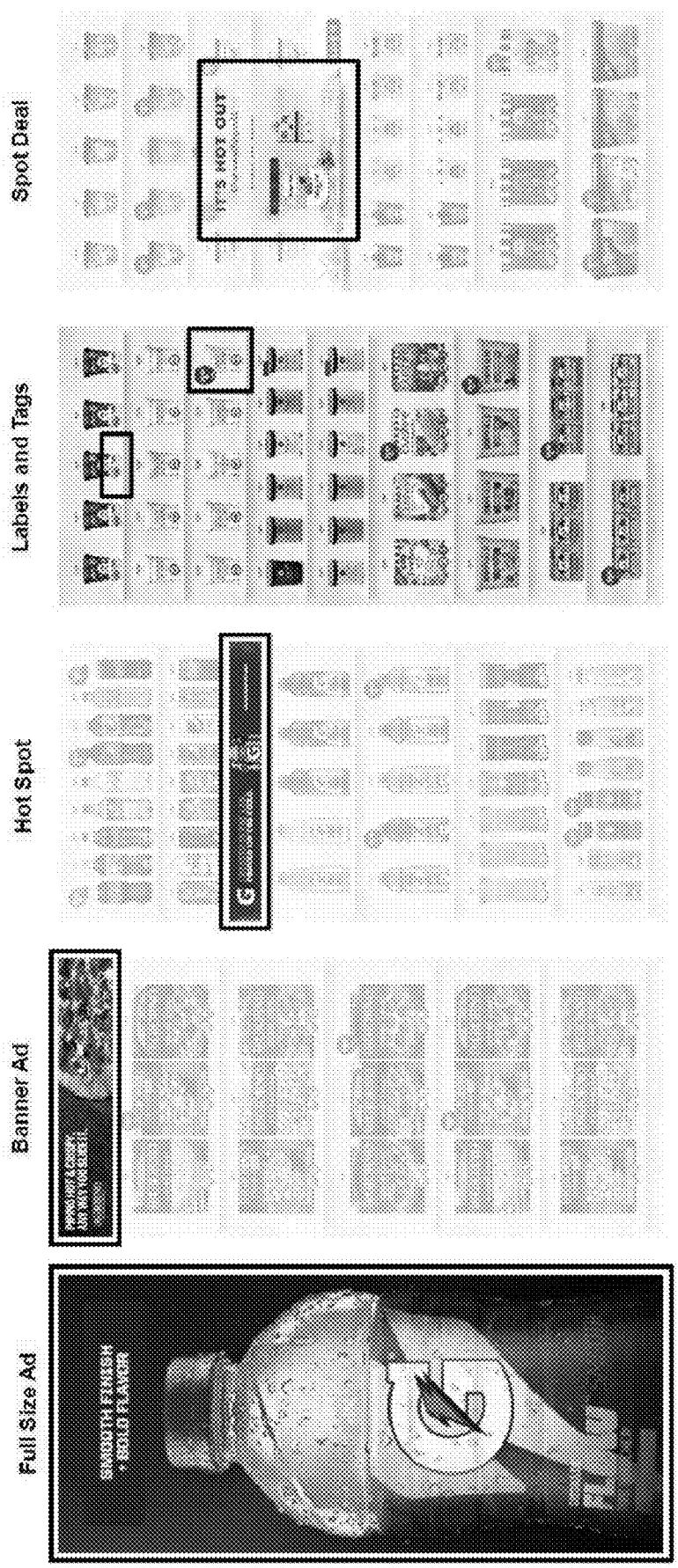
FIG. 10 is illustrates different types of advertisements that can be displayed on the display, such as full size advertisement, a banner advertisement, a hot spot, labels and tags, and a spot deal, for example.

FIG. 6 illustrates solution architecture of the intelligent marketing and advertising platform disclosed herein, FIG. 7 illustrates one possible platform stack of the intelligent marketing and advertising platform disclosed herein, and FIG. 8 (the left half of FIG. 8 is FIG. 8A and the right half of FIG. 8 is FIG. 8B) illustrates one possible system architecture which can be implemented in connection with the present invention. FIG. 9 illustrates a "sandwich" of layers of possible content for the display 16 disclosed herein. FIG. 10 illustrates different types of advertisements that can be displayed on the display 16, such as full size advertisement, a banner advertisement, a hot spot, labels and tags, and a spot deal, for example. FIGS. 6-10 are self-explanatory.

As discussed above, each retail product container 14 preferably comprises inventory-taking hardware 20, such as cameras, that are disposed inside the retail product container 14 and face the products. Specifically, the cameras may be provided on the back 33 of the door 30 which the controller/data collector 12 (shown in FIG. 1) can use to keep track of inventory regarding the interior contents of the retail product container 14. In other words, the controller/data collector 12 is preferably configured to keep track of the inventory of a given retail product container 14 by using the cameras.

As such, an embodiment of the present invention effectively provides an automated ability to detect the inventory of products placed inside each retail product container 14 and update the planograms that are displaying the products on the display 16 (such as an LCD screen). If any item has gone "out of stock," preferably the system is configured to detect and update the information on the display 16 to guide the consumers and store operators.

Preferably, the automatic detection system utilizes cameras, pointed to take pictures of the interior shelves of the retail product container 14 in conjunction with software that utilizes smart algorithms to conduct image analysis and subsequent analytics to extract the required information.

Figure 11:
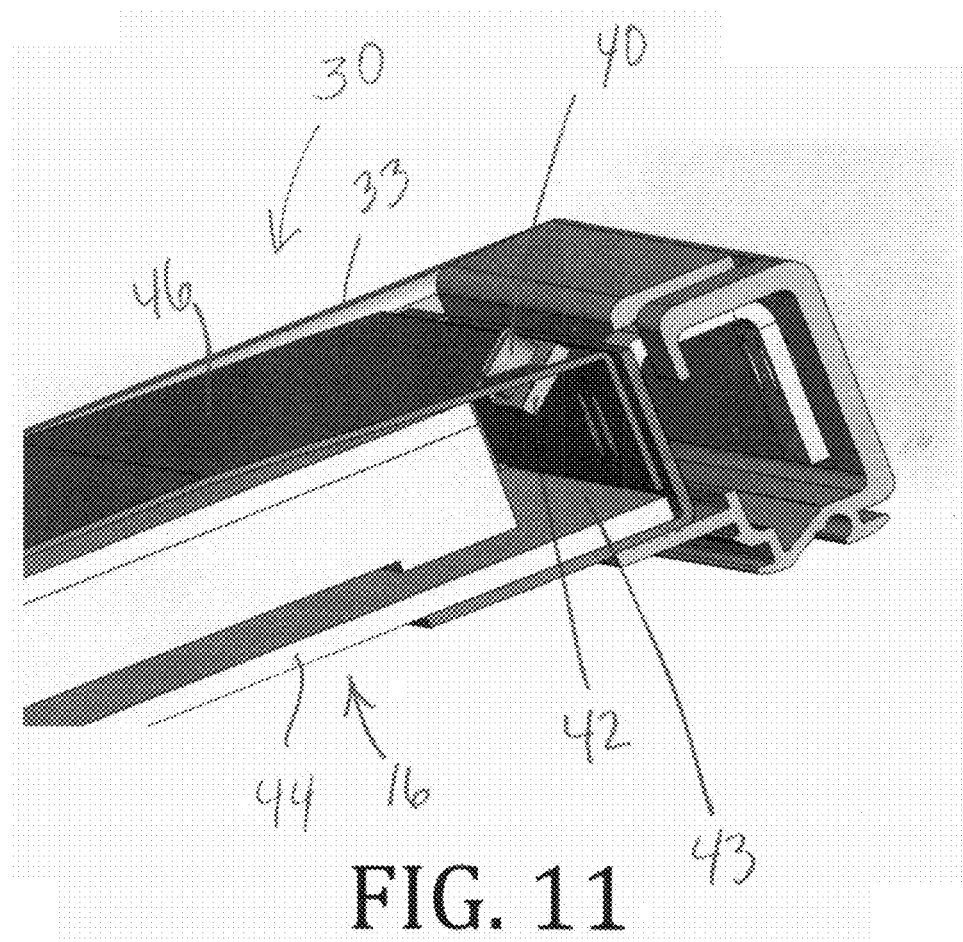
FIG. 11 shows a portion of a door of the retail product container shown in cross-section.

While one embodiment could provide that numerous cameras are placed in arrays to image and assemble the entire shelf area by adding individual pictures together using software, an array of cameras, however, poses challenges as all of them must be plugged into the operating PC which typically has limited number of inputs. Therefore, a more preferred embodiment is shown in FIG. 11, wherein cameras (one of the cameras is identified with reference numeral 40 in FIG. 11) are mounted on the edge of the back 33 of the door 30, and preferably the cameras are housed on brackets 42 tilted at an angle to enable taking pictures when the door 30 is swung open.

Figure 12:
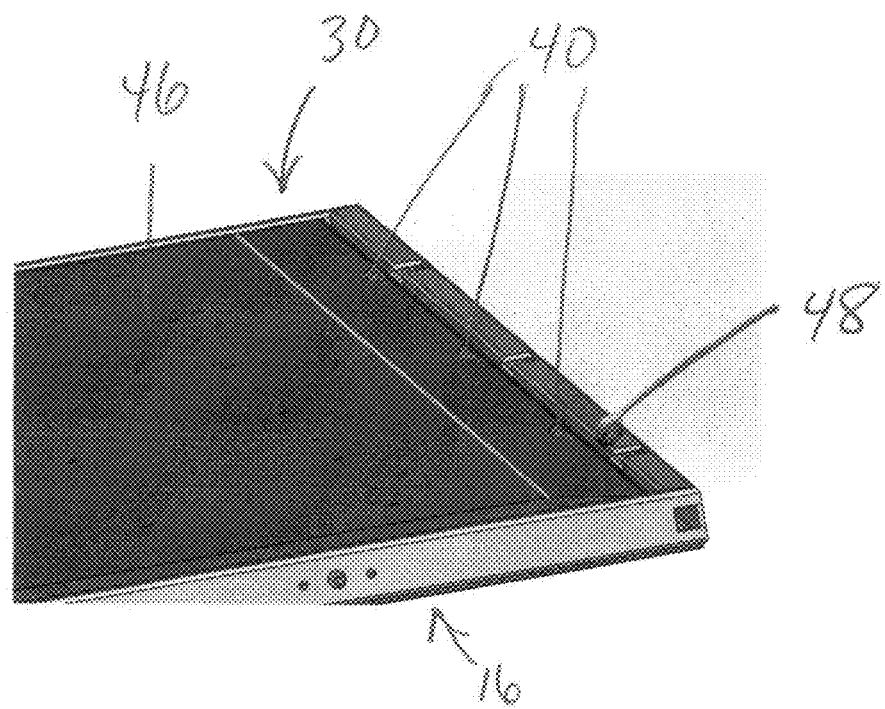
FIG. 12 also shows a portion of the door.

While an embodiment of the present invention could provide that wide field of view cameras (e.g. 180° FOV ("fisheye")) are utilized because they provide for large area coverage, typically the image quality from such cameras is inadequate as objects get severely distorted on the edges, limiting the software's capability to "recognize" the images with regard to the image processing step. As such, a more preferred embodiment provides that miniature cameras with 120° Field of View (Diagonal) are mounted on 45° angled housings along the edge on the handle side of the door 30. As shown in FIG. 11, preferably the cameras are housed within an empty bezel space 43, between the display panel assembly 44 and the unit's mechanical frame 46. Any number of cameras can be provided on the inside of each door of each retail product container 14. For example, as shown in FIG. 12, three cameras 40 may be distributed at an equal distance along the height of each door 30 to allow for complete height and width coverage of the shelf space (i.e., inside the retail product container 14).

Preferably, the system is configured such that during door operation (i.e., when the door 30 is opened), the cameras 40 get triggered and take pictures at various intervals when the door 30 is open. Preferably, the system is configured to process the images and effectively reconstruct the entire shelf. The system may be configured such that the cameras get triggered in any number of ways. For example, the system could be configured such that the cameras get triggered by:

1) Motion being sensed by one or more cameras (if this is the case, preferably the system is configured such that at least one of the cameras remains on all the time); and/or
2) Door motion being effectively sensed by one or more accelerometers 48 (see FIG. 12) on the door 30, wherein the system is configured such that the action of the cameras 40 gets triggered depending on various swing states and locations of the door 30 (i.e., when the door 30 gets opened).

Regardless of exactly what triggers the cameras, preferably the system is configured such that images captured by the cameras are effectively "stitched" together to reconstruct the entire shelf space. Preferably, the system is configured to utilize image processing compare the images and conclude whether any of the products on shelves are missing. If any of the particular products are missing, preferably the system is configured to send a signal to content management software to update the planogram appropriately (i.e., on the display 16), preferably displaying that product as being "out of stock". Additionally, preferably the system is configured to notify a store inventory management team, such that re-stocking of that particular item on that particular shelf can take place quickly.

In preceding embodiment involving the stitching together of multiple captured images, the disclosed system may capture a plurality of images using a first, second, and third camera as the door rotates. For example, the first photo may be taken by the first camera, the second photo may be taken by the second camera, and the third photo taken by the third camera. A controller on or near the retail product container may combine the pertinent portion of the three photos into a single, composite image. Alternatively, instead of a single photo from each of three cameras, the first camera may take multiple photos and combine them with one or more photos taken by the second camera and third camera. In other words, the controller may instruct the plurality of cameras to capture a number of images as the door rotates, thus capturing images from different positions/angles with respect to the internal contents of the retail product container. In one example, the controller may change the frequency of capture of photos—i.e., the controller may increase the number of images captured—if the controller receives measurements that the door is swinging at a higher rotational speed. In another example, the controller may change the frequency and/or other parameters of the cameras based on other situational or environmental factors. For example, in low light situations, the operating parameters of the one or more cameras may be adjusted to accommodate. In other examples, moisture or condensation on a camera lens may be detected and result in the controller modifying the operational parameters of affected cameras.

Furthermore, in other examples, the plurality of cameras installed on the swingable door of a retail product container may be one or more motion video cameras. As such, these video cameras may capture multiple video frames from a start position to a predefined end position of the rotation of the door. The end position may be a set predefined position, a predefined range, or a predefined relative rotation angle from the start position (e.g., once the door has rotated through 60 degrees from a start position.)

In one example, the plurality of images, which are captured by the system using a first, second, and third camera as the door rotates, may be sent to an electronic controller at or near the retail product container. The controller may execute computer-executable instructions to digitally combine the plurality of images into a single panoramic, composite image. The composite image may be large in size, thus consume a sizable amount of computer memory/storage at the controller. In some embodiments, the composite image may undergo post-processing to reduce the storage consumed by the image. In one example, artificial intelligence using a neural network, such as a convolutional neural network, may be used to identify a boundary edge of the pertinent portions of the contents of the retail product container. As a result, those areas of the image outside of the boundary edge may be affirmatively discarded by the post-processing module executing on the controller. The out-of-bound areas may be those portions of the image that are outside of the edge frame of the retail product container. At least one benefit of the preceding example of post-processing is a saving in memory storage capacity at the edge location. Moreover, a smaller image size also results in less network bandwidth consumption to transmit the image from the controller to one or more remote servers in the cloud.

In one example, a controller may be coupled with the one or more cameras installed in or on the door to automatically adjust parameters. The controller may adjust parameters of the camera, such as, but not limited to, exposure, focus position, sensor gain/ISO speed, aperture size, etc. Values for exposure may be in units of time, and other parameters may be in others units in different operating scenarios. Moreover, a person of skill in the art after review of the entirety disclosed herein will appreciate that one or more of the parameters may be interrelated or dependent. For example, an exposure of 1/25 sec at f/11, ISO 100 is equivalent to an exposure of 1/400 sec at f/2.8, ISO 100. In other words, because the shutter speed has been reduced by four stops, this means less light is being captured by the image sensor in the camera. As a result, the aperture is increased in size by four stops to allow more light into the camera assembly. A person having ordinary skill in the art would appreciate that there are benefits and disadvantages to adjusting the parameters in one way versus another. For example, to maximize exposure, camera settings/parameters might be set to a large aperture, 6400 ISO, and a slow shutter speed. In contrast, to minimize exposure, camera settings/parameters would be set to a small aperture, 100 ISO, and a fast shutter speed. Of course, the sharpness of the captured image might be effected by depth of field, aperture, and shutter speed parameters. With many examples disclosed herein involving a capture at a relatively close distance of an image of a stationary retail product stored in a retail product container, the ability to capture an image without introducing blurriness or planar warp is a consideration. Moreover, in some examples, the image sensor of the camera may be in motion at the time of image capture, thus introducing a relative motion between the subject being captured and the camera.

Regarding blurriness, the controller may execute computer-executable instructions (e.g., firmware, software, or application specific integrated circuits) to perform postprocessing on the captured images to mitigate blurriness. In one example, a blurriness mitigation module in the controller may identify portions of captured images that are duplicative across the plurality of images captured. And, then select the appropriate portions from those duplicate images where the blurriness (and other undesirable image characteristics) are reduced. As explained herein, during the process of stitching together the multiple, captured images, the portions identified by the blurriness mitigation module may be incorporated into the final, composite image.

Referring to FIG. 11, when some cameras types are rotated 40°, they may need more than 6 mm of thickness because of the width of the circuit board. The camera position shown in FIG. 11 protrudes beyond the thin cover of the display screen assembly. The proudest point of the camera lies in the same plane as the face of the camera lenses in the display screen assembly, in some embodiments. Meanwhile, in other embodiments, the camera is intentionally positioned to protrude past the edge of the LCD/LED display unit, which is shown as the large light-colored object in the lower left of the illustration of FIG. 11. At least one benefit of such positioning is that the camera's view might not be obstructed. In some embodiments, such positioning might lead to the location of the camera to be about 28" from the hinge axis. In other embodiments, the positioning may be in a range that includes 28". Meanwhile, in other embodiments, the location may be outside of any such range, depending on the implementation.

In one illustrative embodiment, the camera to shelf distance may be positioned at four inches, and the retail products on the shelves may be generally centered relative to the door frame. Meanwhile, the camera may have an about 120° diagonal field of view (FOV) and oriented so that the view is wider in the direction of the camera's skinny dimension. That is, the camera is positioned near the handle side of the door with a 40° tilt towards the hinge side without having its view blocked by the display screen inside the door. While one embodiment identifies a 4" positioning, the disclosure is not so limited. The camera-to-shelf distance may be set to a value other than four inches, in some examples.

Referring to FIG. 12, a portion of a door of a retail product container is shown. The three cameras oriented as shown in FIG. 12 can capture the entirety of a shelf of a retail product container when the door is open at any angle larger than about 25°. In some other examples, the type of camera and/or specifications of the camera may result in the angle being greater or less than 25°.

In those examples where the camera is built with the sensor oriented in the perpendicular direction, two cameras may be enough. Two cameras, positioned 28" or more from the hinge, rotated about 50° towards the hinge edge of the door, can view the entire scene of the contents of a retail product container if the camera locations are 21" from the top and bottom edges and 30" from each other. Of course, a person of skill in the art after review of the entirety disclosed herein will appreciate that the disclosure is not limited to the 21", 30", and 50-degree specifications indicated in the preceding example. Rather, the specifications are understood to be adjusted based on the fundamental teachings of this disclosure.

Figure 13:
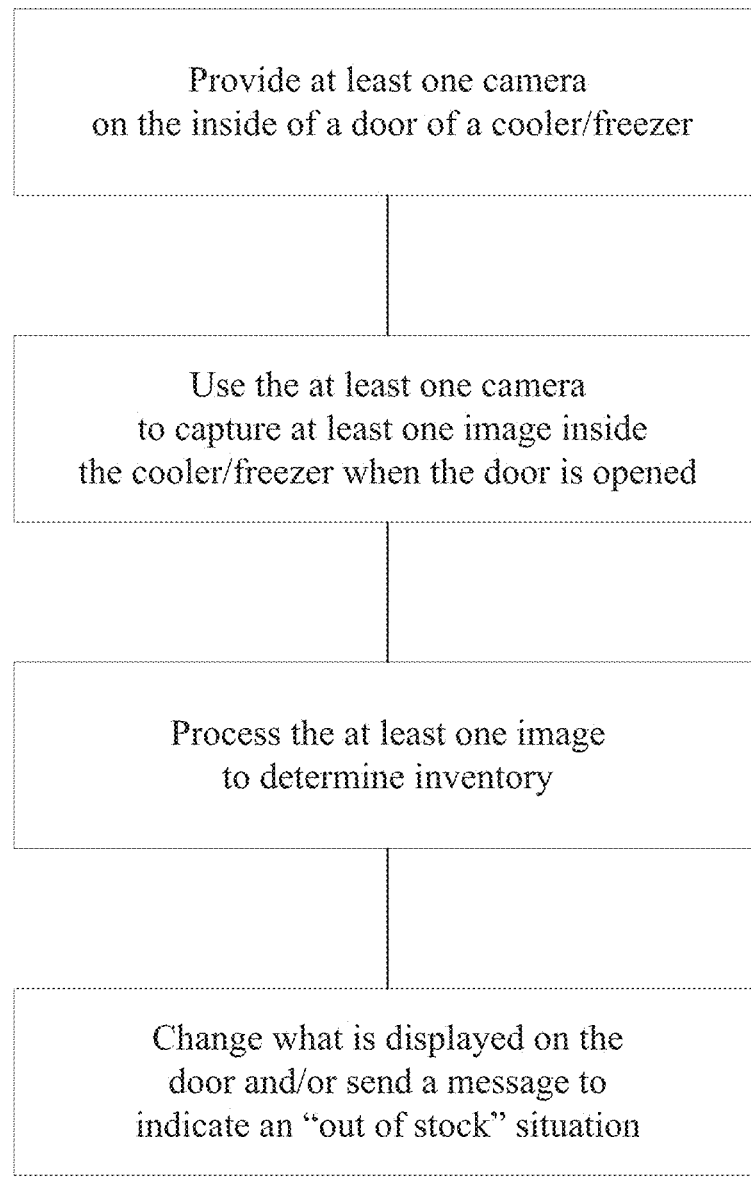
FIG. 13 is a block diagram of a method that is in accordance with an embodiment of the present invention.

FIG. 13 provides a block diagram of a method that is in accordance with an embodiment of the present invention and is self-explanatory given the foregoing description.

Figure 14:
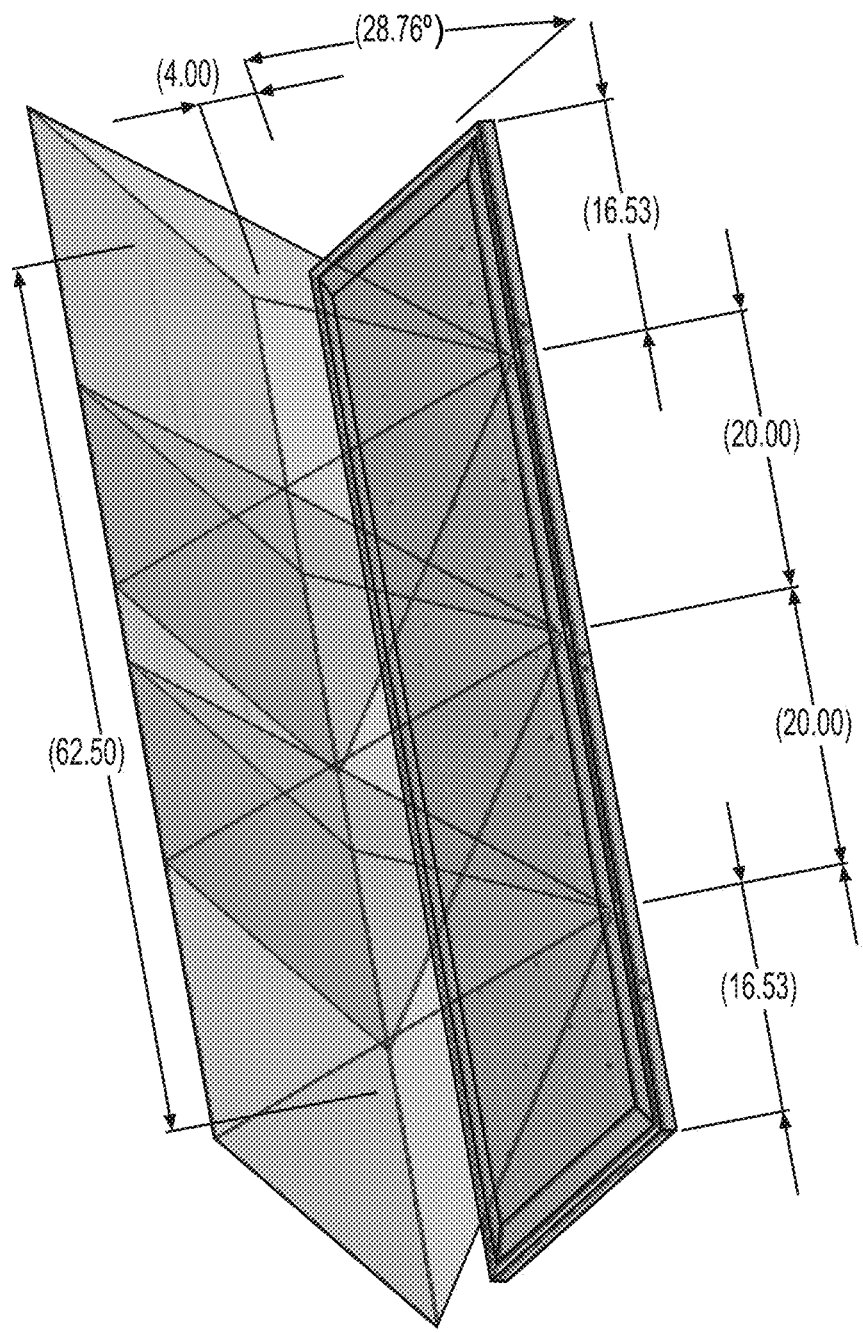
FIG. 14 is one example of spacing for cameras on a door in accordance with one or more examples in this disclosure.

Referring to FIG. 14, one example of spacing for the cameras on a door of a retail product container is illustrated. In the example of FIG. 14, the top and bottom cameras are 16.5" from the outer faces of the door frame. And, the center camera is centered on the door edge and 20" from each of the other two cameras. In other examples where the door is not centered vertically on the products on the shelves inside the retail product container, the position of one or more of the three cameras may be shifted up or down accordingly. The cameras may be angled so their FOV is just slightly missing the inside surface of the door. Because the hinge is close to the edge of the shelves, this positioning keeps the hinge side of the scene at the edge of the camera image for almost all door angles.

Referring to FIG. 15, four illustrations are shown of different views of an illustrative retail product container and door from the front and top when the door is open about 44° or 25°. The camera field of view (FOV) is shown as a transparent pyramid (triangle in the top views). The face of the shelves is shown as a (red) inner plane. When the door is open 30° or more, the entire scene is contained within the FOV. When the door angle decreases to 25°, portions of the scene on the handle side start to move outside the camera FOV. A person of skill in the art after review of the entirety disclosed herein will appreciate that the disclosure is not limited to the specific angles disclosed in the preceding example. Rather, the angles and specifications may be adjusted based on the fundamental teachings of this disclosure.

While a specific embodiment of the invention has been shown and described, it is envisioned that those skilled in the art may devise various modifications without departing from the spirit and scope of the present invention.

What is claimed is:

1. An intelligent marketing and advertising platform comprising: a plurality of retail product containers, each retail product container having internal storage volume, each retail product container comprising at least one non-transparent display which prohibits viewing of the internal storage volume of the retail product container, each retail product container further comprising customer-detecting hardware, and each retail product container comprising inventory-taking hardware; a controller/data collector in communication with the plurality of retail product containers, wherein the controller/data collector is configured to control the at least one non-transparent display of each retail product container such that each non-transparent display provides a planogram relating to retail products physically contained in the internal storage volume of the retail product container based on inventory taken by said controller/data collector using the inventory-taking hardware of the retail product container, wherein the controller/data collector is configured to control the at least one non-transparent display of each retail product container to display current pricing information regarding products physically contained in the internal storage volume of the retail container, wherein the pricing is dictated by the controller/data collector, wherein the controller/data collector is configured to detect customers using the customer-detecting hardware, and wherein the controller/data collector is configured to display promotions on the at least one non-transparent display of each retail product container based on what is detected by the controller/data collector using the customer-detecting hardware, wherein the controller/data collector uses the inventory-taking hardware to capture at least one image of the internal storage volume when a door is opened.

2. The intelligent marketing and advertising platform as recited in claim 1, wherein the controller/data collector is configured to transmit data to a distributor and/or store regarding overall stock relating to the inventory of the plurality of retail product containers.

3. The intelligent marketing and advertising platform as recited in claim 1, wherein each retail product container comprises a cooler/freezer and said at least one non-transparent display of each retail product container comprises a door of said cooler/freezer.

4. The intelligent marketing and advertising platform as recited in claim 1, wherein the inventory-taking hardware comprises at least one camera which captures at least one image when the door is opened.

5. The intelligent marketing and advertising platform as recited in claim 4, wherein the at least one camera captures a plurality of images when the door is opened.

6. The intelligent marketing and advertising platform as recited in claim 4, wherein the door has a back, wherein the at least one camera is mounted on the back of the door, wherein the at least one camera is tilted at an angle relative to the door.

7. The intelligent marketing and advertising platform as recited in claim 4, wherein the door comprises a mechanical frame, wherein the at least one camera is housed within an empty bezel space between the display and the mechanical frame.

8. The intelligent marketing and advertising platform as recited in claim 4, wherein the at least one camera starts taking images upon the at least one camera detecting the door being opened.

9. The intelligent marketing and advertising platform as recited in claim 4, further comprising at least one accelerometer on the door, wherein the at least one camera starts capturing images upon the at least one accelerometer detecting the door being opened.

10. The intelligent marketing and advertising platform as recited in claim 4, wherein the at least one camera is positioned to protrude past an edge of the display.

11. The intelligent marketing and advertising platform as recited in claim 4, wherein the at least one camera is positioned at a handle side of the door with a predetermined tilt towards a hinge side of the door without having a view of the at least one camera blocked by the display.

12. The intelligent marketing and advertising platform as recited in claim 11, wherein the predetermined tilt is 40 degrees.

13. The intelligent marketing and advertising platform as recited in claim 4, wherein the at least one camera comprises three cameras.

14. The intelligent marketing and advertising platform as recited in claim 4, wherein the at least one camera consists of two cameras.

15. An intelligent system for real-time advertising on a movable, non-transparent display on a surface of a retail product container, the intelligent system comprising:
a server comprising:
one or more server processors; and
a server memory storing computer-executable instructions that, when executed by the one or more server processors, cause the server to:
identify, via image recognition using inventory-taking hardware affixed to the retail product container, an inventory of one or more retail products physically contained in the retail product container;
generate a planogram of the one or more retail products physically contained in the retail product container;
display, on at least one non-transparent display on a surface of the retail product container, the planogram, wherein the at least one non-transparent display blocks viewability from outside of the retail product container of the one or more retail products physically contained in the retail product container;
determine, in real-time, current pricing information regarding the one or more retail products physically contained in the retail product container;
display, on the at least one non-transparent display, the current pricing information regarding the one or more retail products physically contained in the retail product container.

16. The system of claim 15, wherein the at least one non-transparent display on the surface of the retail product container is movable from an open position to a closed position, and wherein when in the closed position, the one or more retail products physically contained in the retail product container are blocked from viewability from outside the retail product container.

17. The system of claim 15, wherein the retail product container comprises a cooler/freezer and the at least one non-transparent display of the retail product container comprises a door of said cooler/freezer.

18. The system of claim 17, wherein the inventory-taking hardware comprises at least one camera which captures at least one image when the door is opened, and wherein the at least one camera is positioned to protrude past an edge of the display.

19. The system of claim 17, wherein the at least one camera is positioned at a handle side of the door with a predetermined tilt towards a hinge side of the door without having a view of the at least one camera blocked by the display.

20. The system of claim 15, wherein the at least one non-transparent display of the retail product container comprises a door of said cooler/freezer, the system further comprising at least one accelerometer on the door, wherein the at least one camera starts capturing images upon the at least one accelerometer detecting the door being opened.

\* \* \* \* \*